US011222268B2

(12) United States Patent
Yan et al.

(10) Patent No.: US 11,222,268 B2
(45) Date of Patent: Jan. 11, 2022

(54) DETERMINING ALGORITHMIC MULTI-CHANNEL MEDIA ATTRIBUTION BASED ON DISCRETE-TIME SURVIVAL MODELING

(71) Applicant: Adobe Inc., San Jose, CA (US)

(72) Inventors: Zhenyu Yan, San Francisco, CA (US); Yang Wang, San Jose, CA (US); Arava Sai Kumar, Cupertino, CA (US); Abhishek Pani, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 1066 days.

(21) Appl. No.: 15/454,799

(22) Filed: Mar. 9, 2017

(65) Prior Publication Data
US 2018/0260715 A1 Sep. 13, 2018

(51) Int. Cl.
*G06N 5/02* (2006.01)
*G06N 20/00* (2019.01)
*H04L 29/08* (2006.01)

(52) U.S. Cl.
CPC ............... *G06N 5/02* (2013.01); *G06N 20/00* (2019.01); *H04L 67/20* (2013.01); *H04L 67/22* (2013.01)

(58) Field of Classification Search
CPC .......... G06N 5/02; G06N 20/00; G06N 20/10; G06N 7/005; G06N 99/005; H04L 67/20; H04L 67/22; H04L 67/42
USPC .......................................................... 706/11
See application file for complete search history.

(56) References Cited

U.S. PATENT DOCUMENTS

| 9,047,622 | B1* | 6/2015 | Shaw ............... G06Q 30/02 |
| 9,600,831 | B1* | 3/2017 | Chou ............... G06Q 30/0242 |
| 9,875,484 | B1* | 1/2018 | Schnabl ............ G06Q 30/0242 |
| 9,886,705 | B2* | 2/2018 | Xu ................... G06Q 30/0275 |
| 10,068,247 | B2* | 9/2018 | Xu ................... G06Q 30/0244 |
| 10,198,400 | B1* | 2/2019 | Farner ............... G06N 5/025 |
| 10,217,139 | B2* | 2/2019 | Shottan ............. G06Q 30/0277 |

(Continued)

FOREIGN PATENT DOCUMENTS

| KR | 20100063201 A | * | 6/2010 | |
| WO | WO-2010091050 A2 | * | 8/2010 | ............ G06Q 30/02 |

OTHER PUBLICATIONS

Sinha et al., "Estimating the Incremental Effects of Interactions for Marketing Attribution" Oct. 30, 2014, IEEE International Conference on Behavioral, Economic, and Socio-Cultural Computing. (Year: 2014).*

(Continued)

*Primary Examiner* — Miranda M Huang
*Assistant Examiner* — Chase P. Hinckley
(74) *Attorney, Agent, or Firm* — Keller Jolley Preece

(57) ABSTRACT

The present disclosure relates to a media attribution system that improves multi-channel media attribution by employing discrete-time survival modeling. In particular, the media attribution system uses event data (e.g., interactions and conversions) to generate positive and negative conversion paths, which the media attribution system uses to train an algorithmic attribution model. The media attribution system also uses the trained algorithmic attribution model to determine attribution scores for each interaction used in the conversion paths. Generally, the attribution score for an interaction indicates the effect the interaction has in influencing a user toward conversion.

20 Claims, 11 Drawing Sheets

(56) References Cited

U.S. PATENT DOCUMENTS

| | | | | |
|---|---|---|---|---|
| 10,235,683 | B2* | 3/2019 | Milton | G06Q 30/0201 |
| 10,375,010 | B1* | 8/2019 | Ranjan | H04L 51/36 |
| 10,404,814 | B1* | 9/2019 | Saprykin | H04L 67/18 |
| 10,447,647 | B1* | 10/2019 | Ranjan | H04L 69/14 |
| 10,467,313 | B2* | 11/2019 | Wang | H04L 67/22 |
| 2014/0074587 | A1* | 3/2014 | Briggs | G06Q 30/0202 705/14.41 |
| 2015/0025961 | A1* | 1/2015 | Jorissen | G06Q 30/0201 705/14.45 |
| 2015/0186785 | A1* | 7/2015 | Thieberger | G06Q 10/063 706/12 |
| 2015/0220971 | A1* | 8/2015 | Raj | G06Q 30/0244 705/14.43 |
| 2015/0254709 | A1* | 9/2015 | Carlyle | G06Q 30/0255 705/14.45 |
| 2015/0262077 | A1* | 9/2015 | White | G06N 20/00 706/12 |
| 2015/0317670 | A1* | 11/2015 | Cavander | G06Q 30/0273 705/14.41 |
| 2016/0034948 | A1* | 2/2016 | Zhong | G06Q 30/0246 705/14.45 |
| 2016/0155143 | A1* | 6/2016 | Hsiao | G06Q 30/0283 705/14.45 |
| 2016/0180376 | A1* | 6/2016 | Lu | G06Q 30/0244 705/14.43 |
| 2016/0189201 | A1* | 6/2016 | Shao | G06Q 30/0243 705/14.42 |
| 2016/0189207 | A1* | 6/2016 | Xu | G06Q 30/0249 705/14.48 |
| 2016/0210658 | A1* | 7/2016 | Chittilappilly | G06Q 30/0246 |
| 2016/0267526 | A1* | 9/2016 | Xu | G06Q 30/0246 |
| 2016/0328739 | A1* | 11/2016 | Synett | G06Q 30/0202 |
| 2016/0373891 | A1* | 12/2016 | Ramer | H04W 4/029 |
| 2017/0006135 | A1* | 1/2017 | Siebel | G06F 8/10 |
| 2017/0046374 | A1* | 2/2017 | Fletcher | G06F 3/0484 |
| 2017/0091810 | A1* | 3/2017 | McGovern | G06Q 30/0247 |
| 2017/0098236 | A1* | 4/2017 | Lee | G06Q 30/0244 |
| 2017/0180284 | A1* | 6/2017 | Smullen | H04L 67/322 |
| 2017/0200199 | A1* | 7/2017 | O'Reilly | G06Q 30/0267 |
| 2017/0295121 | A1* | 10/2017 | Zhang | H04L 51/32 |
| 2017/0323330 | A1* | 11/2017 | Chittilappilly | G06Q 30/0244 |
| 2017/0337505 | A1* | 11/2017 | Chittilappilly | G06Q 30/0277 |
| 2017/0337578 | A1* | 11/2017 | Chittilappilly | G06Q 30/0249 |
| 2017/0337588 | A1* | 11/2017 | Chittilappilly | G06N 7/005 |
| 2017/0372347 | A1* | 12/2017 | Li | G06Q 30/0242 |
| 2018/0018710 | A1* | 1/2018 | Chang | G06Q 30/0277 |
| 2018/0032876 | A1* | 2/2018 | Altshuller | G06F 16/9024 |
| 2018/0053224 | A1* | 2/2018 | McClave | G06Q 30/0201 |
| 2018/0060301 | A1* | 3/2018 | Li | G06F 40/35 |
| 2018/0060893 | A1* | 3/2018 | Omer | G06F 17/153 |
| 2018/0075482 | A1* | 3/2018 | Gierach | G06Q 30/0201 |
| 2018/0192244 | A1* | 7/2018 | Deluca | H04L 67/18 |
| 2018/0204249 | A1* | 7/2018 | Vasile | G06Q 30/0275 |
| 2018/0204250 | A1* | 7/2018 | Watine | G06Q 30/0275 |
| 2018/0308123 | A1* | 10/2018 | Zhong | G06Q 30/0273 |
| 2019/0278378 | A1* | 9/2019 | Yan | G06F 3/017 |

OTHER PUBLICATIONS

Li et al., "Attributing Conversions in a Multichannel Online Marketing Environment: An Empirical Model and a Field Experiment" Feb. 2014, Journal of Marketing Research, 51(1), 40-56. (Year: 2014).*

Kateja et al., "VizClick: Visualizing Clickstream Data" Jan. 5, 2014, International Conference on Information Visualization Theory and Applications. (Year: 2014).*

Ji et al., "Additional Multi-Touch Attribution for Online Advertising" Feb. 12, 2017, Proceedings of the Thirty-First AAAI Conference on Artificial Intelligence, pp. 1360-1366. (Year: 2017).*

Ji et al., "A Probabilistic Multi-Touch Attribution Model for Online Advertising" Oct. 24, 2016, pp. 1373-1382. (Year: 2016).*

Jayawardane et al., "Attributing Conversion Credit in an Online Environment: An analysis and Classification" 2015, 3rd Symposium on Computational and Business Intelligence pp. 68-73. (Year: 2015).*

Zhang et al., "Multi-Touch Attribution in Online Advertising with Survival Theory" 2014, IEEE International Conference on Data Mining, pp. 687-696. (Year: 2014).*

Hou et al., "Synergy and Antagonism in Online Advertising" Dec. 6, 2016, IEEE/ACM 3rd International Conference on Big Data Computing, Applications and Technologies, pp. 293-301. (Year: 2016).*

Song et al., "Uncovering Path-to-Purchase Segments in Large Consumer Population using Clustered Multivariate Autoregression" 2014, 24th Annual Workshop on Information Technologies and Systems: Value Creation from Innovative Technologies. (Year: 2014).*

Grbovic et al., "Scalable Semantic Matching of Queries to Ads in Sponsored Search Advertising" Jul. 7, 2016. (Year: 2016).*

Grbovic et al., "E-Commerce in Your Inbox: Product Recommendations at Scale" Jun. 23, 2016. (Year: 2016).*

Lin et al., "Compositional Learning of Relation Path Embedding for Knowledge Base Completion" Feb. 24, 2017. (Year: 2017).*

Kooti et al., "Portrait of an Online Shopper: Understanding and Predicting Consumer Behavior" Dec. 15, 2015. (Year: 2015).*

Hou et al., "Synergy and Antagonism in Online Advertising" Dec. 2016, pp. 293-301. (Year: 2016).*

Geyik et al., "Multi-Touch Attribution Based Budget Allocation in Online Advertising" Aug. 2014, pp. 1-9. (Year: 2014).*

Xu et al., "Lift-Based Bidding in Ad Selection" Feb. 21, 2016, pp. 651-657. (Year: 2016).*

Shao et al., "Data-driven Multi-touch Attribution Models" Aug. 2011, pp. 258-264. (Year: 2011).*

Zhang et al., "Bid-aware Gradient Descent for Unbiased Learning with Censored Data in Display Advertising" Aug. 2016, pp. 665-674. (Year: 2016).*

Juan et al., "Field-aware Factorization Machines in a Real-world Online Advertising System" Jan. 15, 2017. (Year: 2017).*

Geyik et al., "Joint Optimization of Multiple Performance Metrics in Online Video Advertising" Aug. 2016, pp. 471-480. (Year: 2016).*

Vasile et al., "Cost-sensitive Learning for Bidding in Online Advertising Auctions" Mar. 11, 2016, pp. 1-8. (Year: 2016).*

Yin et al., "Mining Effective Subsequences with Application in Marketing Attribution" Dec. 2016, pp. 700-707. (Year: 2016).*

Dalessandro et al., "Causally Motivated Attribution for Online Advertising" Aug. 2012. (Year: 2012).*

Anderl et al., "Mapping the customer journey: Lessons learned from graph-based online attribution modeling" Mar. 19, 2016, pp. 457-474. (Year: 2016).*

Wooff et al., "Time-Weighted Multi-Touch Attribution and Channel Relevance in the Customer Journey to Online Purchase" 2015, pp. 227-249. (Year: 2015).*

Ghavamzadeh et al., "Online Learning to Rankin Stochastic Click Models" Mar. 7, 2017. (Year: 2017).*

Feldman et al., "Online Pricing with Strategic and Patient Buyers" 2016, pp. 1-13. (Year: 2016).*

Kim et al., "Purchase Influence Mining: Identifying Top-k Items Attracting Purchase of Target Item" Apr. 2016, pp. 57-58. (Year: 2016).*

Li et al., "Attribution Strategies and Return on Keyword Investment in Paid Search Advertising" 2016, pp. 831-848. (Year: 2016).*

Yu et al., "A Dynamic Recurrent Model for Next Basket Recommendation" Jul. 2016, pp. 729-732. (Year: 2016).*

Guidotti et al., "Next Basket Prediction using Recurring Sequential Patterns" Feb. 23, 2017, pp. 1-27. (Year: 2017).*

* cited by examiner

DETERMINING ALGORITHMIC MULTI-CHANNEL MEDIA ATTRIBUTION BASED ON DISCRETE-TIME SURVIVAL MODELING

BACKGROUND

Advancements in computer and communication technologies have increased the ability at which people can communicate, connect, and search and find information. In addition, these modern communication technologies empower businesses and companies to broaden their customer reach and influence. One advantage that conventional communication systems (e.g., systems that employ these modern communication technologies) provide to businesses and companies is the ability to reach individuals through a variety of media channels. For example, a business can provide information, promotions, and offers to potential customers via mailers, phone calls, commercials, Internet ads, emails, in-application messages, notification, or text messages. Despite these and other advantages, however, conventional communication systems still face a number of drawbacks.

Because conversions (e.g., purchases of product or services) are often a result of influencing an individual via multiple media channels, one significant shortcoming of conventional communication systems is the inability to identify the importance and influence of each media channel driving a conversion. To demonstrate, a business often targets (via a conventional systems) an individual through a variety of media channels to influence the individual to purchase a particular product. If the user makes a conversion, conventional systems can only provide the business with a listing of which media channels were employed to drive the purchase. However, conventional systems often leave the business unsure as to the influence and effectiveness of each media channel used to drive the user to make the purchase. In other words, conventional systems lack the ability to accurately determine an attribution value for each media channel that leads users to make conversions.

Many attempts have been made to solve this issue of proper media channel attribution. Examples of conventional systems and methods include first touch attribution, last touch attribution, equal linear weight attribution, strict time decayed attribution, and position based attribution. However, these methods ignore one or more relevant media channels, disregard the time-decaying influence of media channels, discount the interactions between media channels, and/or employ predetermined and non-adaptable rules. As a result, these conventional systems and methods provide inaccurate attribution results.

Accordingly, these along with additional problems and issues exist with regard to conventional systems and methods. Hence, there remains a need for an improvement in the area of multi-channel media attribution.

BRIEF SUMMARY

One or more embodiments of the present disclosure include systems and methods that provide improved multi-channel media attribution through a novel process that employs discrete-time survival modeling. In particular, in one or more embodiments, the disclosed systems and methods employ an algorithmic attribution model to intelligently determine the influence of each interaction that leads an individual to purchase a product or service. Further, the disclosed systems and methods employ the algorithmic attribution model to identify which media channel(s) will best drive an individual to make a purchase based on their individual event/interaction history.

To briefly demonstrate, the disclosed systems and methods identify an event history for a user (i.e., individual) that includes one or more interactions and one or more conversions corresponding to the user. Upon identifying the event history, the systems and methods divide or discretize the event history for the user into multiple conversion paths. Each conversion path includes interactions from the user's event history as well as a conversion indication (e.g., whether the user made a purchase). For each conversion path, based on the lag of each interaction in the conversion path, the disclosed systems and methods generate a training observation for an algorithmic attribution model. Using the training observation, the systems and methods train the algorithmic attribution model, which generates weights for each interaction from the event history at various lag increments.

In addition, the disclosed systems and methods determine an attribution score for each interaction. For example, the disclosed systems and methods identify positive conversion paths (i.e., paths that end in a conversion). Using the positive paths, the systems and methods determine an attribution score (e.g., a marginal score and/or a fractional score) for each interaction based on the generated weights and lag corresponding to each interaction. The disclosed systems and methods can then use attribution scores to create customized visualizations, such as one that compares and contrasts the effects of each interaction over time (e.g., as lag increases) as it relates to product conversions.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The disclosure describes one or more embodiments with additional specificity and detail through the use of the accompanying drawings, as briefly described below.

DETAILED DESCRIPTION

Figure 1A:
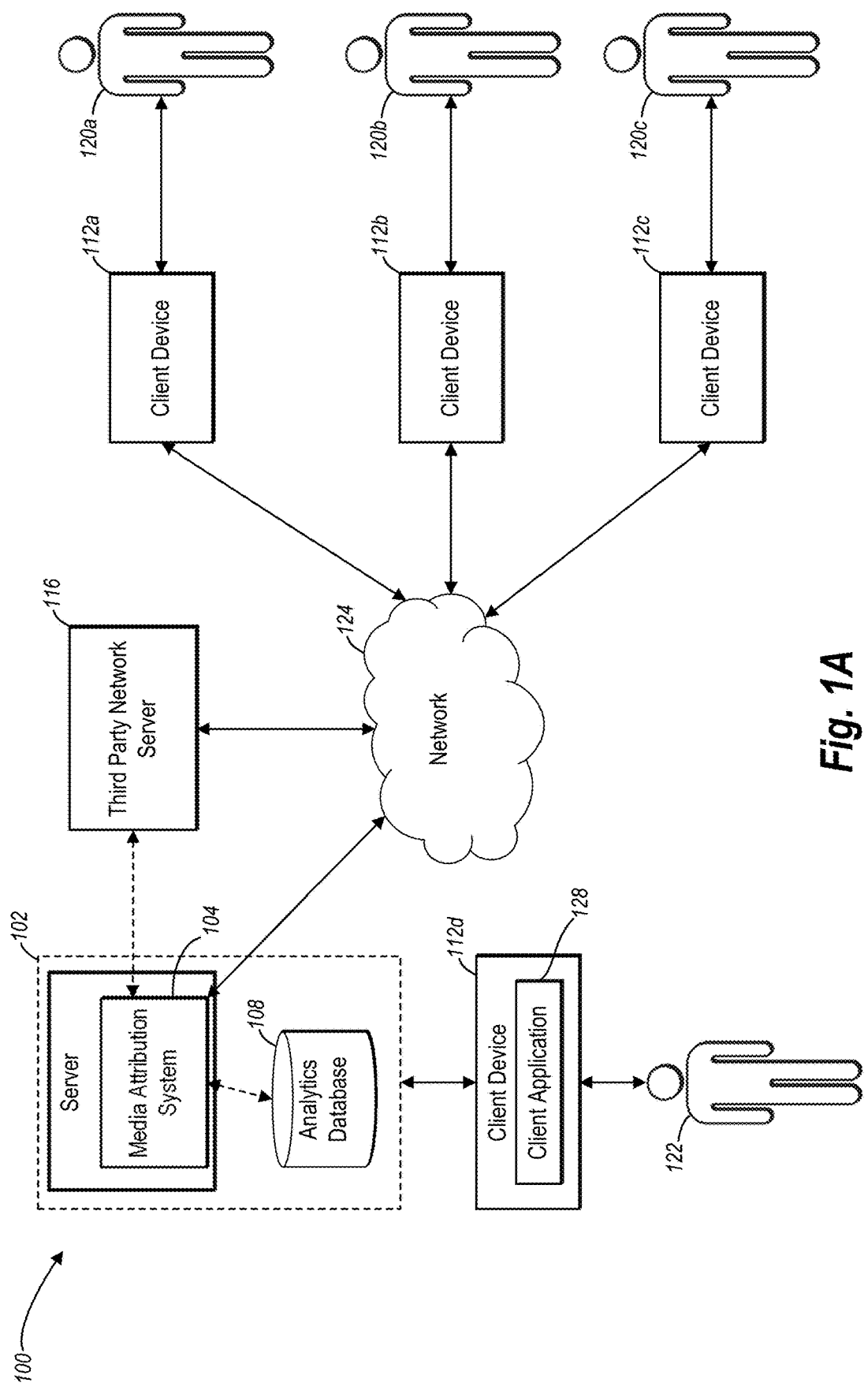
FIG. 1A illustrates a block diagram of an environment in which the media attribution system can operate in accordance with one or more embodiments.

One or more embodiments of the present disclosure include a media attribution system that improves multichannel media attribution by employing discrete-time survival modeling. In particular, the media attribution system uses event data (e.g., interactions and conversions) in connection with a discrete-time survival model to generate positive and negative conversion paths. The media attribution system then uses the conversion paths to train an algorithmic attribution model, which the media attribution system employs to determine attributions scores for each interaction. As described in detail below, employing the media attribution system discretizes lag, addresses time-decaying media effects, tokenizes the events to eliminate influence of duplicate events, and uses control variables to reduce bias. In addition, the media attribution system employs the generated algorithmic attribution model to determine attribute scores (e.g., marginal and fractional scores) that accurately reveal the influence of interaction types leading to conversions.

To demonstrate, in one or more embodiments, the media attribution system identifies an event history that includes interactions and conversions. As used herein, the terms "interaction" or "media touchpoint" (or simply "touchpoint") refers to a point of contact between a user and a commercial entity (e.g., a business or company). "Interaction" and "touchpoint" are used interchangeably herein. Interactions primarily occur via one or more media channels, such as the Internet (e.g., electronic messages, web browsers, Internet-enabled applications), radio, television, print (e.g., newspapers, mailers, and magazines), and billboards. Example touchpoints are advertisements, free trials, website visits, etc. Example media channels include email, social media, organic search, pay-for-click, etc.

The term, "conversion" refers generally to the act of a user converting from a non-paying customer into a paying customer. For example, a user performs a conversion when he or she purchases a product or service (for ease of explanation, the term product hereafter refers to both products and services and includes subscriptions, bundles, and on-demand/one-time purchasable products). In some embodiments, conversions include non-purchases, such as when a user performs a specified action (e.g., signs up for a free-trial or update, downloads an application or software, or performs membership registration).

As mentioned above, the media attribution system identifies an event history for a user. For example, the media attribution system accesses a database that includes events, such as interactions between multiple users and a commercial entity. Further, the media attribution system can limit the identified event history to a specified a time window or period (e.g., the last 7 or 30 days). Using the identified event history, the media attribution system divides (i.e., discretizes) the event history for the user into multiple time units, such as days. For each time unit, the media attribution system generates a conversion path that indicates whether the time unit includes a conversion, and what interactions, if any, preceded a conversion. A conversion path that includes a conversion is positive; otherwise, the conversion path is negative.

In various embodiments, in connecting identifying interactions to include in a conversion path, the media attribution system employs tokenization. Tokenization is grouping neighboring interactions having the same interaction type together into a tokenized interaction (or simply "token"). For example, when a user is presented with a display advertisement multiple times within a short period, the effect of the interaction (e.g., the display of the ad) is not doubled or tripled by displaying the ad twice or three times to the user in an hour. As such, tokenization groups multiple occurrences of an interaction (called sub-tokens) into a single tokenized interaction, which increases accuracy when determining attribution scores.

For each conversion path (positive or negative), the media attribution system generates a training observation used to train an algorithmic attribution model. As described in detail below, each training observation includes a responsive variable indicating whether the path is positive or negative, and one or more dependent variables representing interactions each having a time-lag. For example, a dependent variable "tp_1×3" represents a type-1 touchpoint (e.g., interaction or group of type 1 touchpoints) that occurred 3 time units (e.g., days) before the end timestamp (e.g., either a conversion timestamp or end of path timestamp) in the conversion path.

Using the training observations, the media attribution system trains the algorithmic attribution model. As used herein, an "algorithmic attribution model" is a computer-based logistic regression model that indicates the influence of each interaction (or another variable) when multiple types of interactions contribute to the overall influence of a user's action (e.g., a conversion). The attribution model is algorithmic in that it employs machine learning or statistical models to determine the weights, as opposed to being rule-based (i.e., using predetermined weights based on rules). The algorithmic attribution model trains based on observations that incorporate a discrete-time survival model, which is a type of time-to-event model. In addition, the media attribution system can create a supervised learning model (e.g., via machine learning) based on the algorithmic attribution model, as provided below.

By training the algorithmic attribution model with the generated training observations, the media attribution system can generate weights for each interaction from the event history at various lag increments. Stated differently, the media attribution system can determine coefficients for each interaction/lag combination used within the conversion paths based on the influence of each interaction relative to the other types of interactions. In addition, as the media attribution system gathers additional data (e.g., new or updated event histories), the media attribution system can further train the algorithmic attribution model.

In connection with training the algorithmic attribution model, in some embodiments, the media attribution system employs down-sampling to achieve improved results. In general, the media attribution system will identify a greater number of negative conversion paths (e.g., days with no conversion) than positive conversion paths. Down-sampling involves proportionally reducing the number of negative conversion paths to have the same magnitude as the number of positive conversion paths. Down-sampling, therefore, reduces the amount of computational resources needed to train and employ the algorithmic attribution model, thus improving one or more computing devices implementing the media attribution system and/or algorithmic attribution models.

The media attribution system, in one or more embodiments, also applies various constraints when training the algorithmic attribution model. For example, the media attribution system applies a pattern constraint, such as a decay pattern or regularization terms. Likewise, the media attribution system can input control variables, such as exposure duration or user profile/demographic types, to reduce bias to the algorithmic attribution model. Further, the media attribution system can employ coefficients constraints, such as positive and monotonic behavior constraints, to require accurate diminishing returns.

In addition to training the algorithmic attribution model, the media attribution system also employs the trained algorithmic attribution model to determine an attribution score for interaction types. To determine an attribution score, the media attribution system identifies positive conversion paths, or paths ending with a conversion. Using the positive paths, the media attribution system determines an attribution score for each interaction in the path.

In some embodiments, the value of the converted product serves as a factor in determining a conversion score. For example, the media attribution system scores an interaction included in the positive conversion path as more important when the transaction value of the purchased product is high. Alternatively, in some embodiments, the value of a conversion is included as a parameter along with the training observations when training the algorithmic attribution model, which carries forward into the attribution scores for the interaction.

As part of determining attribution scores, in some embodiments, the media attribution system determines marginal scores and fractional scores for each interaction. A marginal score reflects the importance between types of interactions that resulted in a conversion. A fractional score is a normalized marginal score and indicates the importance of all interactions as a whole in conversion.

In further embodiments, the media attribution system generates visualizations that display results, such as the attributions scores, marginal scores, and fractional scores for each interaction. One example includes a visualization comparing the weights between interaction. Another example includes a visualization comparing the decay curves between multiple algorithmic attribution models. A further example includes a visualization of comparing the ratio of marginal scores or the ratio of fractional scores between combinations of interactions. As part of providing visualizations, the media attribution system can provide a graphical user interface that enables user input (e.g., a dashboard) to an administrator (e.g., n employee of a commercial entity). The user can provide input to customize the type of visualizations shown.

Additionally, in one or more embodiments, the media attribution system uses the algorithmic attribution model to generate additional conversions. For example, for users that have not made a product purchase, the media attribution system inputs interactions served to the user into the algorithmic attribution model, which identifies the interaction type that has the highest likelihood of influencing the user to purchase one or more products. The media attribution system can continue this process until a conversion occurs with the user.

As briefly described above, the media attribution system provides a number of advantages over conventional systems and methods. For example, the media attribution system generates an algorithmic attribution model that is data driven and algorithmic. In addition, the algorithmic attribution model is a multi-stage attribution model that addresses the influence of interactions on other interactions. Furthermore, by using constraints on weights (e.g., coefficients (positive, monotonic), the media attribution system can observe diminishing returns on various interaction types and allows a marketer to use resources (computing or monetary) in a manner to minimize inefficient targeting. The algorithmic attribution model employs statistical models to determine interaction weights. In contrast, conventional systems and methods use predetermined weights based on rules, which does not accurately reflect the influence of each interaction.

Additionally, the algorithmic attribution model reduces bias by using control variables, such as duration of exposure. Furthermore, the algorithmic attribution model uses tokenization to eliminate the influence of duplicate touch points in marginal scores.

As another advantage, the algorithmic attribution model is a scalable algorithm. As such, the media attribution system can accommodate large datasets running across one or more computing devices. For example, the media attribution system can train and run the algorithmic attribution model in parallel (e.g., using an engine for large-scale data processing, such as APACHE SPARK®) across multiple computing devices.

Additional benefits, advantages, features, and characteristics of the media attribution system are described below with respect to the figures, which describe one or more embodiments of the media attribution system. To illustrate, FIG. 1A is a block diagram illustrating an environment 100 in which the media attribution system 104 can operate. As illustrated in FIG. 1, the environment 100 includes a marketing system 102, client devices 112a-112d, third-party network server(s) 116 (e.g., web server(s)), users 120a-c, a user/administrator 122, and a network 124 (e.g., the Internet).

As further illustrated in FIG. 1A, the client devices 112a-112c communicate with the third-party network server(s) 116 and the media attribution system 104 through the network 124. Although FIG. 1A illustrates a particular arrangement of components, various additional arrangements are possible. For example, the client devices 112a-112c may directly communicate with the third-party network server(s) 116 bypassing the network 124. Similarly, the client device 112d may communicate with the marketing system 102 through the network 124 rather than directly communicating with the marketing system 102.

As shown in FIG. 1A, the users 120a-120c include users who access one or more websites, applications, content, or support provided (in whole or in part) by the third-party server(s) 116. While FIG. 1A illustrates three users 120a-120c, in alternative embodiments, the environment 100 includes any number of users. For example, in some embodiments, the environment 100 includes hundreds, thousands, millions, or even billions of users.

As also shown in FIG. 1A, the marketing system 102 includes a media attribution system 104 hosted on a server (or multiple servers) and an analytics database 108. The media attribution system 104 manages and queries data corresponding to some or all of the users 120a-120c as described herein. Additionally, in some embodiments, the media attribution system 104 manages and queries data corresponding to other users associated with the third-party network server(s) 116.

For example, the client devices 112a-112c transmit some or all of the data (corresponding to some or all of the users 120a-120c) through the network 124 to the third-party network server(s) 116. To generate the transmitted data or initiate communications, the users 120a-120c interact with the client devices 112a-112c, respectively. The client devices 112a-112c may include, but are not limited to, mobile devices (e.g., smartphones, tablets), laptops, desktops, or any other type of computing device, such as those described below in relation to FIG. 10. Similarly, the network 124 may include any of the networks described below in relation to FIG. 10.

In addition to generating data, the client devices 112a-112c communicate with the third-party network server(s) 116 for a variety of purposes. For example, in one or more embodiments, the client devices 112a-112c communicate with the third-party network server(s) 116 to request a webpage, upload a file, update a profile, download a game, and so forth. Accordingly, in some embodiments, the third-party network server(s) 116 include or support a web server, a file server, a social networking system, a program server, an application store, or a content provider. When the third-party network server(s) 116 include web server(s) to support an ecommerce business, for example, the client device 112a may communicate with the web server by requesting webpages from the web server for display via a web browser operating on the client device 112a.

The marketing system 102, in one or more embodiments, monitors various interactions, including data related to the communications between the client devices 112a-112c and the third-party network server(s) 116. For example, the marketing system 102 tracks interaction data that includes, but is not limited to, data requests (e.g., URL requests, link clicks), time data (e.g., a time stamp for clicking a link, a time duration for a web browser accessing a webpage, a time stamp for closing an application), path tracking data (e.g., data representing webpages a user visits during a given session), demographic data (e.g., an indicated age, sex, or socioeconomic status of a user), geographic data (e.g., a physical address, IP address, GPS data), and transaction data (e.g., order history, email receipts).

In some instances, the client device 112a communicates with the third-party network server(s) 116 to request for information or content (such as a webpage). The marketing system 102 monitors the information request, the time the request was made, the geographic information associated with client device 112a (e.g., a geographic area associated with an IP address assigned to the client device 112a or GPS information identifying a location of the client device 112a), and any demographic data associated with the user 120a.

The marketing system 102 monitors user data in various ways. In one or more embodiments, the third-party network server(s) 116 tracks the user data and then reports the tracked user data to an analytical server. Alternatively, the marketing system 102 receives tracked user data directly from the client devices 112a-112c. In particular, the marketing system 102 may receive information via data stored on the client device (e.g., a browser cookie, cached memory), embedded computer code (e.g., tracking pixels), a user profile, or engage in any other type of tracking technique. Accordingly, the marketing system 102 can receive tracked user data from the third-party network server(s) 116, the network 124, and/or the client devices 112a-112c.

In one or more embodiments, the third-party network server(s) 116 include an advertisement server that facilitates interactions with a content provider. For example, the third-party network server(s) 116 display ads, paid search results, targeted emails, and so forth to the users 120a-c via client devices 112a-b. In additional embodiments, the third-party network server(s) 116 also include content servers that provide content (e.g., webpages, software, files, images, games, or data) to the users 120a-c. In alternative embodiments, the marketing system 102 also includes an advertisement server.

To illustrate by way of example, a content server from the third-party network server(s) 116 first serves content to a user 120a via the client device 120a, such as a webpage. Within the webpage, an advertisement server from the third-party network server(s) 116 or the marketing system provides ads and/or paid search results to the user 120a. As the user 120a interacts with the ads and/or paid search results, the marketing system 102 including the media attribution system 104 receives data corresponding to the interaction, which is stored in the analytics database 108. Further, the media attribution system 104 can create and use an algorithmic attribution model based on the stored interactions, as described below in FIG. 1B.

Figure 1B:
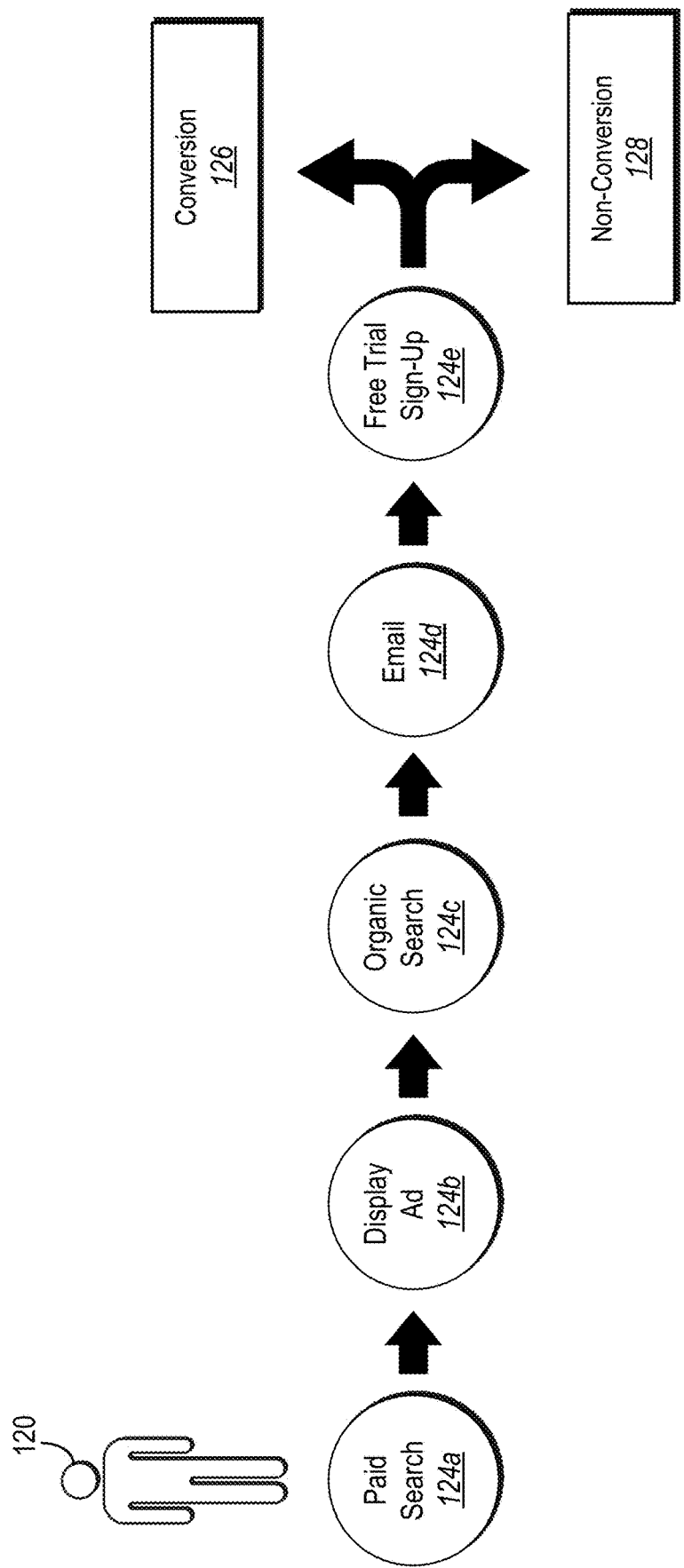
FIG. 1B illustrates a block diagram of a multiple interactions via a plurality of media channels in accordance with one or more embodiments.

FIG. 1B shows a block diagram of a user 120 and various touchpoints 124a-e (i.e., interactions) provided via multiple media channels. As shown, the result of an interaction (or a series of interactions) can be a conversion 126 (e.g., a purchase, download, or subscription) or non-conversion 128. As mentioned above, touchpoints are a type of interactions and include points of contact between a user (e.g., an individual) and an entity (e.g., commercial entity or product provider) that attempt to influence the user to purchase or use a product. In one or more embodiments, an entity uses multiple media channels to provide touchpoints to a user. While FIG. 1B is described in terms of touchpoints, one will appreciate that the principles in FIG. 1B also apply to other types of interactions.

To illustrate, the first touchpoint 124a in FIG. 1B is a paid search (i.e., a paid promotion that appears in response to a user's search). In general, advertisement server (either part of the marketing system 102 or a third-party advertisement server) delivers the first touchpoint 124a via a browser in response to a user's search within the browser on a client device. However, in some embodiments, the first touchpoint 124a occurs elsewhere, such as within a mobile application, or in response to a search performed via voice command.

As another example, the second touchpoint 124b is a display ad. An advertisement server delivers the display ad to the user 120 via an Internet browser, within an application, via a commercial (e.g., via a streaming service), in print media, or through other media channels. Similarly, the marketing system or a third-party advertisement server may serve the third touchpoint 124c, the fourth touchpoint 124d, and the fifth touchpoint 124e via a variety of media channels.

As shown in FIG. 1B, the user's actions either results in a conversion 126 or a non-conversion 128. When a conversion occurs, however, the conversion is a result of the multiple touchpoints 124a-e influencing and driving the user to convert. In these cases, the media attribution system 104 102 next identifies the amount influence each touchpoint had in driving the user to the conversion 126. In cases where non-conversion occurs, one or more of the touchpoints 124a-e may yet be influential in driving the user to convert.

As mentioned above, conventional systems and methods have struggled with the issue of accurately allocating attribution values to touchpoints when a conversion is a result of multiple touchpoints. Rather, conventional systems employ predetermined methods. Examples of these predetermined methods include first touch attribution (i.e., the first touchpoint is credited with the conversion) or last touch attribution (i.e., the last touchpoint before the conversion is credited with the conversion), equal linear weight attribution (i.e., all touchpoints are equally credited), strict time decayed attribution (i.e., weights linearly decrease as the time from conversion increases), and position based attribution (i.e., touchpoints at predetermined positions are assigned predetermined weights irrespective of the type of touchpoint at each position).

In contrast, the media attribution system 104 employs an algorithmic attribution model that dynamically and intelligently determines the weights for each touchpoint based on a number of factors. In particular, the media attribution system 104 gathers information identifying which combinations of touchpoints lead to conversions versus nonconversions. Further, the media attribution system 104 incorporates discretize lag to address the time-decaying effect of the touchpoints.

Figure 2:
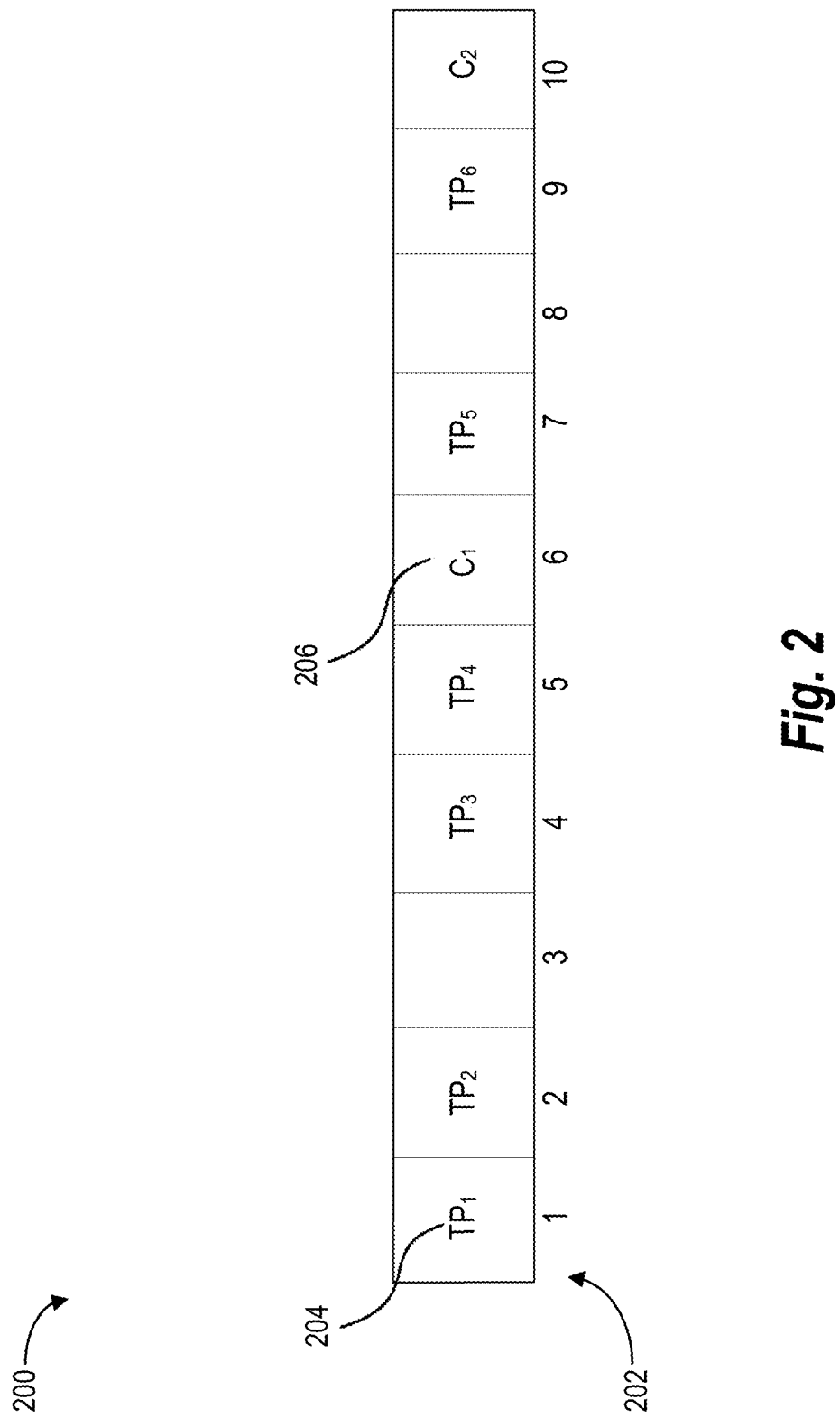
FIG. 2 illustrates an example timeline of user events in accordance with one or more embodiments.

To further illustrate, FIG. 2 shows a timeline 200 of events for a single user. A "user event" or "event" includes touchpoints and conversions. For example, each time the user interacts with a particular entity (e.g., a touchpoint), the media attribution system 104 stores the touchpoints within the analytics database 108. Likewise, the media attribution system 104 stores conversions with the analytics database 108. Together, the stored events form an event history for the user.

As mentioned, the media attribution system 104 can store events for multiple users in the analytics database 108. For example, upon detecting a touchpoint, the media attribution system 104 records a user identifier ("user id"), a product identifier ("product id"), touchpoint identifier ("touchpoint id), media channel identifier ("media id"), and/or touchpoint timestamp. Similarly, the media attribution system 104 stores the user id, product id, touchpoint id, and a conversion timestamp associated with a conversion. In addition, the media attribution system 104 can also store the product value (e.g., free, $10 per month, or $150) and other information related to the conversion.

When storing event data for multiple users in an event database, the media attribution system 104 can filter a user's event history by identifying events that include the user id of the user. Further, the media attribution system 104 can provide time parameters (e.g., a conversion window) when analyzing a user's event history. For example, the media attribution system 104 requests the events within 7, 30, 180, or 365 days of a conversion. As another example, the media attribution system 104 requests the last 5, 10 or 50 occurring events.

FIG. 2, as mentioned above, illustrates a timeline 200 of user events for a single user. For example, the timeline 200 represents a user's event history for a particular conversion window. The timeline 200 is separated or discretized into time units 202. For purposes of explanation, the time units 202 are described in terms of days (e.g., shown as Day 1, Day 2, . . . Day 10 corresponding to time units 1-10). One will appreciate, however, that the time unit 202 may be represented by different units of time, such as static units (e.g., hours, days, weeks, or months) and/or dynamic units (e.g., a new unit starts after an event occurs or after a different type of event occurs).

The timeline 200 in FIG. 2 also includes touchpoints 204 and conversions 206. As shown, the touchpoints are labeled $TP_1$, $TP_2$, $TP_3$, $TP_4$, $TP_5$, and $TP_6$, and the conversions are labeled $C_1$ and $C_2$. The touchpoints 204 and conversion 206 are separated by days within the timeline. For example, the first conversion (i.e., $C_1$) occurred on Day 6 and the second conversion (i.e., $C_2$) occurred on Day 10. Further, a touchpoint 204 and a conversion 206 can (and often) occur on the same day. However, for ease of explanation, touchpoints and conversions are not shown on the same day within the timeline 200. Likewise, each occurrence of a touchpoint 204 within the timeline 200 can include multiple touchpoints occurring within that day.

Overall, the timeline 200 in FIG. 2 illustrates that the user experienced one or more touchpoints 204 on Days 1, 2, 4, 5, 7, and 9 (and also possibly Days 6 and 10), a conversion on Days 6 and 10, and no events on Days 3 and 8. Using the event data from the timeline 200, the media attribution system 104 trains an algorithmic attribution model and uses the algorithmic attribution model to determine attribution scores for each touchpoint (and/or each touchpoint type), as described in connection with FIG. 3. For purposes of explanation, the timeline 200 and events shown in FIG. 2 will be referred to while describing FIG. 3.

Figure 3:
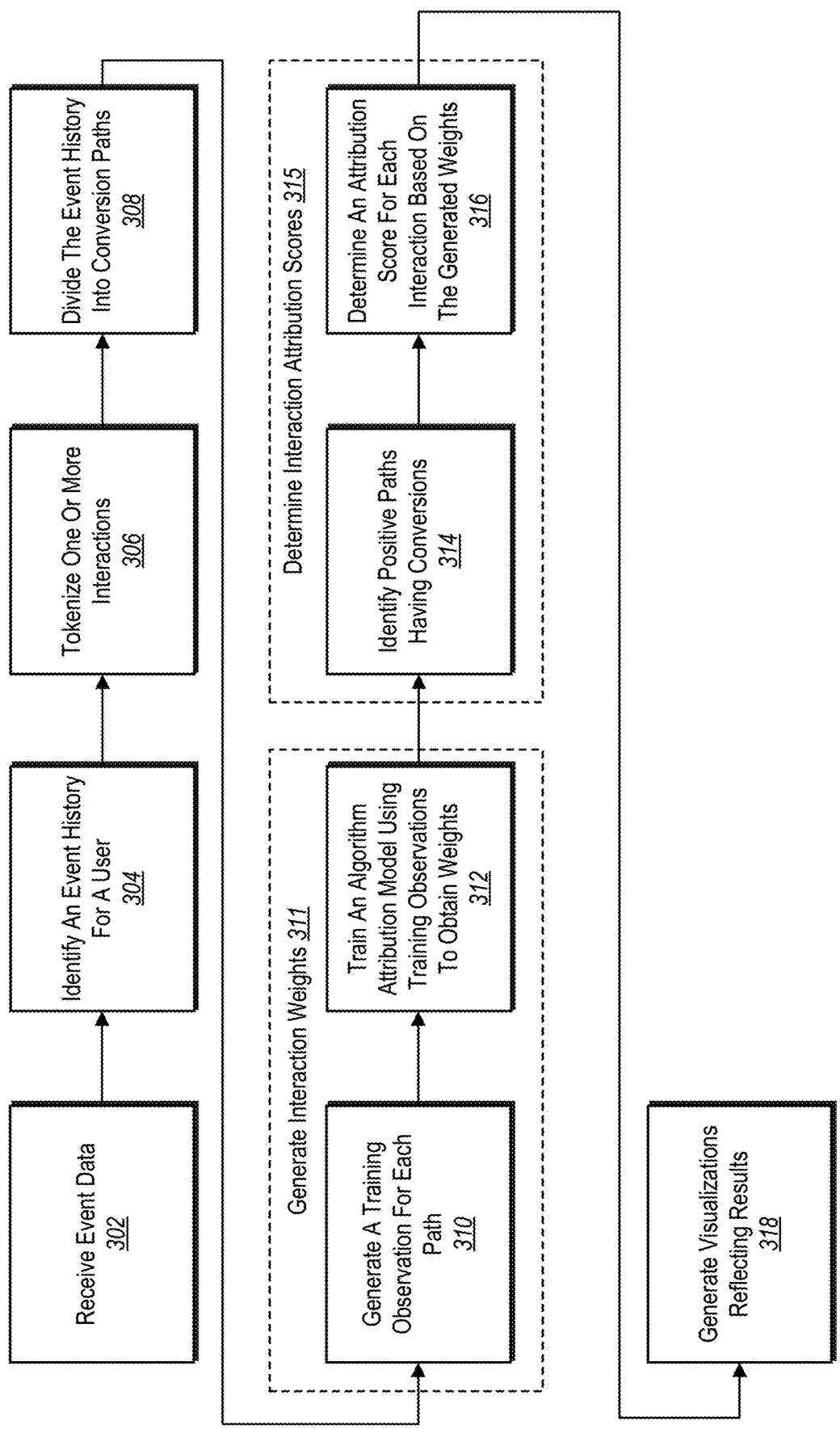
FIG. 3 illustrates an example block-flow diagram of a media attribution system generating and applying an algorithmic attribution model in accordance with one or more embodiments.

FIG. 3 illustrates a block-flow diagram of the media attribution system 104 generating and applying an algorithmic attribution model. The media attribution system 104 can perform the actions shown in FIG. 3. For instance, the media attribution system 104 receives 302 event data for a group of users. For example, the media attribution system 104 collects and stores event data for the group of users over a period of time. Alternatively, the media attribution system 104 receives event data for a particular user. As an example, the media attribution system 104 receives the event data for a user, as shown in the timeline 200.

The media attribution system 104 filters the event data based on a conversion window, or a parameter specifying a particular time range (e.g., the last ten days or 100 days, or between start date i to end date j). For example, when the media attribution system 104 requests event data from the analytics database 108, the media attribution system 104 requests events that occurred within the conversion window. Alternatively, the media attribution system 104 requests all event data connected to a user or a group of users without applying any filters.

When the media attribution system 104 collects event data corresponding to multiple users, the media attribution system 104 identifies event data for a particular user. In other words, the media attribution system 104 identifies 304 an event history for the user that corresponds to the conversion window. For example, the media attribution system 104 isolates each event that includes the user id of the user that occurred after the start time and before the end time specified by the conversion window.

If a user experiences multiple touchpoints having the same type within a short period of time, the influence of the second or third touchpoints does not double or triple the user's desire to purchase a product. As such, in one or more embodiments, the media attribution system 104 employs tokenization, which similarly groups the interactions/touchpoints having the same interaction type as a single interaction.

As shown in FIG. 3, the media attribution system 104 tokenizes 306 one or more interactions/touchpoints together to create a tokenized interaction (i.e., a token). More specifically, the media attribution system 104 identifies interactions having the same interaction type that occur close to one another in time. For example, upon identifying an interaction having a particular interaction type, the media attribution system 104 determines if other interactions having the same interaction type occurred within a specified duration. Each interaction included within a token is a sub-tokenized interaction (i.e., a sub-token).

To demonstrate, for each interaction type, the media attribution system 104 establishes a start token timestamp (e.g., token head) and an end token timestamp (e.g., token tail). The token head generally starts with the interaction having the earliest timestamp for the particular interaction type. Then, if another interaction having the same interaction type occurs before an end token timestamp, the media attribution system 104 includes the other interaction in the token. The media attribution system 104 can set the duration between the start token timestamp and the end timestamp, for example, as one hour, six hours, or 24 hours. Alternatively, media attribution system 104 sets the duration for a token based on a predetermined time duration (e.g., every hour starting at midnight, each 12-hour cycle, or per calendar day). Further, the duration between the start and end token timestamps may vary based on the tokenized interaction type. For example, display ads have a duration of an hour, while email clicks have a duration of a day.

When multiple interactions having the same interaction type occur between the start and end token timestamps, in one or more embodiments, the media attribution system 104 tokenizes the interactions together (e.g., creates a token), where each interaction becomes a sub-token within the token. The result is that the media attribution system 104 treats each token with all its sub-tokens acts as a single interaction/touchpoint within a conversion path. For example, the media attribution system 104 provides multiple paid search ads to a user on Day 4 of the timeline 200. As such, the media attribution system 104 generates a token that group the multiple interactions as a single interaction (e.g., $TP_4$).

In some embodiments, the media attribution system 104 restricts the length of a token to a limited number of sub-tokens. For instance, an inverse-weight (or compression ratio, which is 1/inverse-weight) specifies the number of sub-tokens that the media attribution system 104 will include in a token. For example, if the media attribution system 104 identifies 13 interactions having the same type within a short duration, and the inverse-weight is 5 (e.g., compression ratio of 0.2 or ⅕), then the media attribution system 104 generates 3 tokens, where Token1 and Token2 include 5 interactions, and Token3 includes the remaining 3 interactions.

The media attribution system 104 can organize the sub-tokens within a token in a variety of ways. For instance, the media attribution system 104 orders the sub-tokens from first occurring (i.e., earliest timestamp) to last occurring (i.e., latest timestamp). For example, in the above example of 13 interactions, the media attribution system 104 organizes the interactions as follows: Token1 includes sub-tokens 1-5, Token2 includes sub-tokens 6-10, and Token3 includes sub-tokens 11-13. In an alternative example, the media attribution system 104 arranges the interactions in reverse order, as follows: Token1 includes sub-tokens 13-9, Token2 includes sub-tokens 8-4, and Token3 includes sub-tokens 3-1. In another example, the media attribution system 104 randomly orders and distributes the sub-tokens and/or applies other factors such as elapsed time between the sub-tokens. Further explanation and examples of tokenization and sub-token ordering are provided after FIG. 8.

In some embodiments, the media attribution system 104 selects the timestamp of one of the sub-tokens (e.g., the timestamp of the first sub-token, a timestamp of the middle sub-token, or the timestamp of the last sub-token) to represent the token's timestamp within the conversation path. For example, in the above example, Token1 uses the timestamp of the Sub-token13, Token2 uses the timestamp of Sub-token9, and Token3 uses the timestamp of Sub-token3. Alternatively, the media attribution system 104 calculates an average or mean timestamp for each sub-token in a token to represent the token's timestamp.

In some embodiments, the inverse-weight and/or the time duration of a token is user defined, for instance, by an administrator. For example, if the administrator determines that ten impressions of an ad within a single hour have the same effect as a single impression, then the user can select ten as the inverse-weight. Further, the user can individually provide inverse-weights and/or durations for each interaction type. In an alternative embodiment, the media attribution system 104 calculates an optimal inverse-weight and/or durations for each interaction type. For example, the media attribution system 104 learns and updates the inverse-weight for each interaction type upon training, applying, and re-training the algorithmic attribution model.

Using interactions and, when applicable, tokenized interactions that serve as interactions, the media attribution system 104 generates conversion paths. As shown in FIG. 3, the media attribution system 104 divides 308 the event history (i.e., events within the conversion window) into conversion paths. In some embodiments, generating conversion paths includes separating events (e.g., by day), then generating conversion paths based on the separated events (e.g., creating one conversion path per day).

As part of creating a conversion path, the media attribution system 104 designates each conversion path as either positive or negative. A positive conversion path has a conversion on the day to which the path corresponds. For example, the conversion paths for Day 6 and Day 10 in the timeline 200 are positive conversion paths. Paths that do not end or result with a conversion are negative conversion paths (e.g., Days 1-5, and 7-9).

Besides including the event that occurred within the day to which the conversion path corresponds, each conversion path includes touchpoints 204 (i.e., interaction) that occurred on previous days within the conversion window. For example, as shown in the timeline 200, the (negative) conversion path for Day 4 includes $TP_1$, $TP_2$, and $TP_3$, and the (positive) conversion path for Day 6 includes $TP_1$, $TP_2$, $TP_3$, $TP_4$, and $C_1$. In some embodiments, a conversion path (positive or negative) limits the number of previous events included in a conversion path, such as limiting the number of interactions to five or fewer.

In various embodiments, a conversion path does not include previous conversions that occurred on previous days. For instance, as shown in the timeline 200, the (negative) conversion path for Day 7 includes $TP_1$, $TP_2$, $TP_3$, $TP_4$, and $TP_5$, but not $C_1$. Similarly, the (positive) conversion path for Day 10 includes $TP_1$, $TP_2$, $TP_3$, $TP_4$, $TP_5$, $TP_6$, and $C_2$, but not $C_1$. In some embodiments, however, a conversion path can include all previous events dating back to the starting timestamp of the conversion path, including previous conversions.

As part of generating conversion paths, the media attribution system 104 incorporates the lag of each interaction included in the conversion path. The media attribution system 104, in a number of embodiments, determines lag from the end time of a conversion path. For example, the end time (e.g., end timestamp) of a negative conversion path is at the end of the day to which the path corresponds and the end time of a positive conversion path is the time of the conversion. In addition, the media attribution system 104 generally determines lag based on the time unit used to separate events in the conversion window. For instance, if the media attribution system 104 separates events by day, then the media attribution system 104 also uses days as the time unit to determine the lag of each interaction within a conversion path.

To illustrate, as shown in the timeline 200, the conversion paths for Day 1, Day 2, and Day 9 each include the first touchpoint (i.e., $TP_1$). In the conversion path for Day 1, $TP_1$ has a lag of 0 days. In the conversion path for Day 2, $TP_1$ has a lag of 1 day. In the conversion path for Day 9, $TP_1$ has a lag of 8 days.

As shown in FIG. 3, the media attribution system 104 generates 310 a training observation for each conversion path to train an algorithmic attribution model. As part of generating a training observation for a conversion path, the media attribution system 104 includes a conversion indicator (e.g., whether the path is positive or negative), the interactions included in the conversion path, and the lag associated with each interaction. For example, for each conversion path, the media attribution system 104 sets a response variable (e.g., "y") to 1 to indicate a positive conversion path and to 0 to indicate a negative conversion path. Additionally, for training observation generated for each conversion path, the media attribution system 104 sets a dependent variable (e.g., "x") that indicates the time when a particular interaction occurred. For instance, the dependent variable of $TP_1$-$L_3$ indicates that $TP_1$ happened three days before the end of the conversion path (e.g., the end timestamp).

Using the training observations from the user and other users, the media attribution system 104 trains 312 the algorithmic attribution model to obtain weights. In one or more embodiments, the algorithmic attribution model is a logistic regression model. In such embodiments, the media attribution system 104 can estimate the weights utilizing stochastic gradient descent. For example, the media attribution system 104 generates a prediction using current values of the weights and calculates new values for the weights based on error in the prediction. The media attribution system 104 can repeat this process until the algorithmic attribution model is accurate enough (e.g., error drops to some desirable level) or for a fixed number iterations. In one or more embodiments, the algorithmic attribution model sets the initial weights to zero. By training the algorithmic attribution model, the media attribution system 104 determines the relative effect toward conversion for each interaction at each lag increment. In other words, training the algorithmic attribution model generates the weights (i.e., logistic regression coefficients) for each combination of an interaction and lag.

In general, the media attribution trains the algorithmic attribution model with positive and negative conversion paths to obtain weights (i.e., effect, significance, or influence) for each interaction. For example, the media attribution system 104 increases the weight of interactions that are included in positive conversion paths and reduces the weight of interactions that are included in negative conversion paths. Further, the media attribution system 104 determines patterns and combinations of interactions in both positive and negative conversion paths, which also influence the weights of each interaction. Further, the product value (i.e., cost) of conversions also affects the weights. Additional description about training the algorithmic attribution model is provided below.

As shown in FIG. 3, the block-flow diagram includes an optional step 311, which is a step for generating weights for each interaction from the event history. In some embodiments, the step 311 for generating weights for each interaction from the event history includes the actions of generating 310 a training observation for each path and training 312 an algorithmic attribution model using the training observations to obtain weights. Accordingly, the step 311 for generating weights for each interaction from the event history can be performed as described above in connection with action 310 and action 312, as well as the further details and structure provided below.

Once trained, the media attribution system 104 can use the algorithmic attribution model to determine attribution scores for each interaction. For example, in one or more embodiments, the algorithmic attribution model again uses conversion paths to determine the attribution scores. In particular, the media attribution system 104 employs positive conversion paths to arrive at attribution scores for each interaction or for each interaction type.

To demonstrate, using the weights, the media attribution system 104 analyzes conversion paths to determine how influential or effective each interaction type was in bringing about the conversion (e.g., an attribution score). Accordingly, as shown in FIG. 3, the media attribution system 104 identifies 314 positive conversion paths from the user's event history within the conversion window.

Using the positive conversion paths and the generated weights, the media attribution system 104 determines 316 an attribution score for each interaction type. For example, the media attribution system 104 inputs the interaction in each positive conversion path into the algorithmic attribution model, and the algorithmic attribution model uses the generated weights corresponding to each interaction or interaction type to determine an attribution score for the interactions.

As part of determining an attribution score for each interaction (e.g., touchpoint), in some embodiments, the media attribution system 104 generates marginal scores and fractional scores for each interaction type. As mentioned above, a marginal score reflects the importance between interaction types when providing multiple interaction types resulted in a conversion. As such, a marginal score indicates how much more likely a user is to purchase a certain product if the media attribution system 104 provides a particular interaction (or interaction type) to the user (given the interactions already provided to the user in the conversion path). More specifically, a marginal score provides the increased probability that a conversion will occur when the media attribution system 104 adds a given interaction type to a conversion path having other existing interaction types. As a note, marginal scores are positive (e.g., ≥0), which makes them monotonically increasing.

In embodiments where the media attribution system 104 determines marginal scores, the system determines a marginal score for each interaction (or tokenized interaction) in a conversion path. In high-level terms, the marginal score for an interaction in a conversion path is:

$$\frac{P_i - P_{i-1}}{P_N} \quad (1)$$

where $P_i$ represents the probability of a user's conversion when provided interaction i, $P_{i-1}$ represents the probability of a user's conversion when provided the interaction just prior to interaction i, and $P_N$ represents the probability of a user's conversion given all interactions in the conversion path (including a baseline probability or effect described below). As such, a marginal score can indicate the amount of much influence a particular interaction has given the previous interactions and all interactions in a conversion path.

As a simplified illustration, consider the positive conversion path for $C_1$ from the timeline 200 in FIG. 2, which includes $TP_1$, $TP_2$, $TP_3$, $TP_4$, and $C_1$. The media attribution system 104 determines the marginal score for each interaction (e.g., touchpoint) within the path. Before the media attribution system 104 can determine marginal scores for each interaction, as recently mentioned, the media attribution system 104 determines a baseline probability effect (i.e., $P_0$), or the probability of conversion for a user if the media attribution system 104 provides no interactions to the user (e.g., the likelihood of a conversion with no previous contact). Next, the media attribution system 104 determines the marginal score for the first interaction (e.g., $TP_1$), which is the probability (i.e., $P_1$) that a user will have a conversion upon the media attribution system 104 providing only the first interaction to the user. As such, the media attribution system 104 determines $P_1-P_0$. The media attribution system 104 can then calculate the marginal score for $TP_1$ by dividing $P_1-P_0$ by the probability that the user will have a conversion after the media attribution system 104 provides all interactions in the conversion path (i.e., $P_N$). To demonstrate, if $P_0$ is 20%, $P_1$ is 40%, and $P_N$ is 80%, then the marginal score for the $TP_1$ is ((40%-20%)/80%) or 25% (i.e., ¼), which indicates that providing the first interaction in the conversion path results in the conversion probability for a user increasing by 25%.

Then, the media attribution system 104 determines the marginal score for the second interaction (e.g., $TP_2$), which is the probability (i.e., $P_2$) that a user will have a conversion upon the media attribution system 104 providing $TP_2$ to the user given that the media attribution system 104 has already provided $TP_1$ to the user (e.g., $P_2-P_1$). Again, this result is divided by $P_N$ to calculate the marginal score for $TP_2$. Continuing the above example, if $P_2$ is 50%, then the marginal score for $TP_2$ is ((50%-40%)/80%) or 12.5% (i.e., ⅛), which indicates that providing $TP_2$ beyond the $TP_1$ in the conversion path increase the probability of conversion by 12.5%. Further, the media attribution system 104 continues this pattern for the third interaction (e.g., $TP_3$) and the fourth interaction (e.g., $TP_4$) until the media attribution system 104 calculates the marginal score for each interaction in the conversion path.

The media attribution system 104, in one or more embodiments, also determines a total marginal score for the conversion path. Again, in high-level terms, the total marginal score indicates the probability of a user's conversion for all interactions beyond that of a baseline probability (i.e., $P_0$). For example, the media attribution system 104 can calculate the total marginal score as:

$$\frac{P_N - P_0}{P_N} \quad (2)$$

where $P_N$ represents the probability of a user's conversion given all interactions in the conversion path, $P_0$ represents the probability of a user's conversion given provides no interactions (e.g., the baseline probability effect).

As such, the total marginal score for a conversion indicates the influence that providing the interactions to the user would have on the user's conversion. Continuing the above example, if the baseline probability (i.e., $P_0$) of conversion for the user is 20%, and the probability of a user's conversion given all interactions in the conversion path (e.g., $P_N$) is 80%, then the total marginal score is ((80%-20%)/80%) or 75% (i.e., ¾), which indicates that providing all interactions in the conversion path increases the probability of conversion for a user by 75%.

In some embodiments, the media attribution system 104 determines a marginal score for a tokenized interaction (e.g., token). In these embodiments, the media attribution system 104 can evenly distribute the marginal score for the token among the sub-tokens for purposes of scoring each interaction within the algorithmic attribution model and calculating an accurate attribution score. For example, if the media attribution system 104 tokenized the first interaction (e.g., $TP_1$) with a marginal score of 20% (see above example) to include five sub-tokens, then the media attribution system 104 assigns each sub-token with one-fifth (⅕) of the marginal score (e.g., 5% or (25%/5)).

As mentioned above, the media attribution system 104 can also determine a fractional score for each interaction. A fractional score is a normalized marginal score and indicates the importance of all interactions as a whole in conversion. By normalizing marginal scores to each interaction type, the media attribution system 104 can equally compare marginal scores across interactions. Further, normalizing marginal scores to each interaction or interaction type enables the media attribution system 104 to accurately train the algorithmic attribution model using uniformly scored data across users.

The media attribution system 104 can compute the fractional score by dividing the marginal score for each interaction by the total marginal score. To illustrate, in the above example, the marginal score for $TP_1$ is 25%, the marginal score for $TP_2$ is 12.5%, and the total marginal score for the conversion path is 75%. As such, the fractional score for $TP_1$ is (25%/75%)=⅓=33.3%. The fractional score for $TP_2$ is (12.5%/75%)=⅙=16.63%. Further, in the case of a tokenized interaction, as described above, where a sub-token has a marginal score of 5%, then the fractional score for the sub-token is (5%/75%)=1/15=0.06%.

Further details for calculating tokens, marginal scores, and fractional scores are provided below following the description of FIG. 8. In addition, the below description includes various implementation details for the media attribution system 104 for performing embodiments disclosed herein.

As shown in FIG. 3, the block-flow diagram includes an optional step 315, which is a step for determining interaction attribution scores. In some embodiments, performing the step 315 for determining interaction attribution scores includes the actions of identifying 314 positive conversion paths and determining 316 an attribution score for each interaction or interaction type based on the generated weights. Accordingly, the step 315 for determining interaction or interaction type attribution scores can be performed as described above in connection with action 314 and action 316, as well as the further details and structure provided below.

In one or more embodiments, the media attribution system 104 uses the attribution scores (e.g., marginal and fractional scores) with the algorithmic attribution model to determine, with a high statistical confidence, whether serving a particular interaction or interaction type to user would result or significantly increase the probability of a conversion. In a similar manner, the media attribution system 104 uses the attribution scores with the algorithmic attribution model to determine which interaction or interaction type, if provided to the user next (either directly or through an advertisement server), has the greatest likelihood of resulting in a conversion for a particular product given the other interactions already provided to the user. For example, the media attribution system 104 uses the algorithmic attribution model to determine that, based on the combination of the user's previous interactions and corresponding lag, the probability of the user purchasing a product increases to 80% upon the media attribution system 104 sending one or more emails to the user.

Based on these determinations, the marketing system 102 can provide (either directly or through an advertisement server) the identified interactions to users. The media attribution system 104 can then verify if serving the identified interaction results in a conversion. In addition, the media attribution system 104 can use the results to create additional training observations and further train the algorithmic attribution model, as described herein, which further improves the accuracy of the media attribution system 104 and the algorithmic attribution model.

In addition, FIG. 3 illustrates generating 318 visualizations reflecting one or more results. Examples of visualizations include comparing the generated weights or attribute scores between interaction and/or interaction types. Another example of a visualization includes comparing results generated from different algorithmic attribution models (e.g., based on the conversions of different products). Additional examples of visualizations are shown and described in connection with FIGS. 5-8 below.

Figure 4:
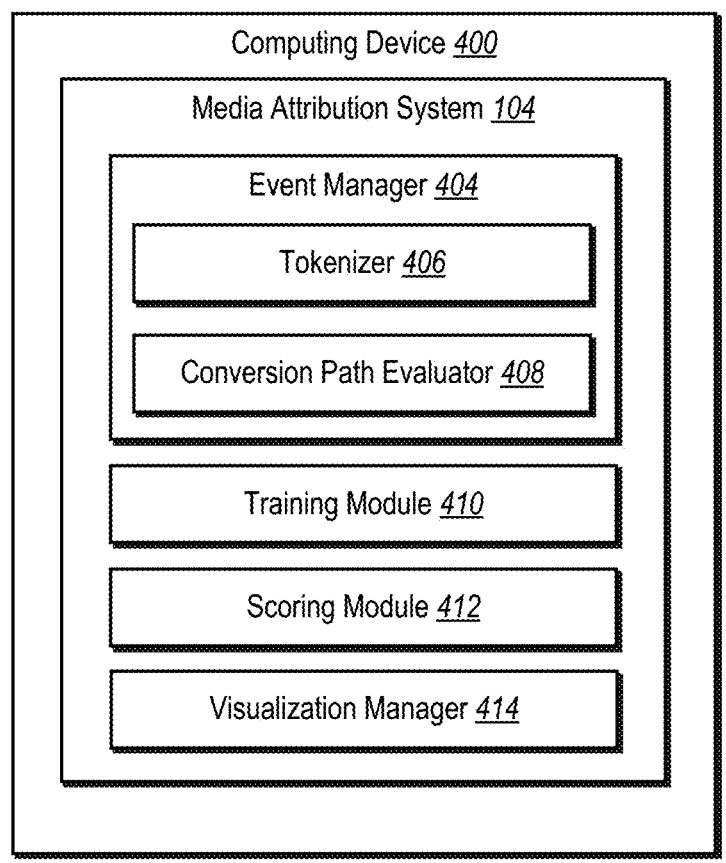
FIG. 4 illustrates an example schematic diagram of the media attribution system in accordance with one or more embodiments.

FIG. 4 illustrates an example schematic diagram of the media attribution system 104. The media attribution system 104 may represent one or more embodiments of the media attribution system 104 described above. In addition and as shown, the media attribution system 104 resides on a client device 400. The illustrated client device 400 may represent various types of computing devices as described below with respect to FIG. 10. For example, the client device 400 represents one or more server devices that host to the media attribution system 104.

As shown, the media attribution system 104 includes various components for performing the processes and features described herein. For example, the media attribution system 104 in the illustrated embodiment includes an event manager 404 having a tokenizer 406 and a conversion path evaluator 408, a training module 410, a scoring module 412, and a visualization manager 414. The media attribution system 104 can include additional components not shown, such as a database for storing data related to the media attribution system 104.

The components 404-414 of the media attribution system 104 can include software, hardware, or both. For example, the components 404-414 can include one or more instructions stored on a computer-readable storage medium and executable by processors of one or more computing devices, such as a client device or server device. When executed by the one or more processors, the computer-executable instructions of the media attribution system 104 can cause the computing device(s) to perform the feature learning methods described herein. Alternatively, the components 402-414 can include hardware, such as a special-purpose processing device to perform a certain function or group of functions. Alternatively, the components 404-414 of the media attribution system 104 can include a combination of computer-executable instructions and hardware.

As mentioned above, the media attribution system 104 includes an event manager 404. In general, the event manager 404 obtains and organizes events (e.g., interactions and conversion events) into positive and negative conversion paths. More specifically, the event manager 404 accesses event data corresponding to one or more products for a particular conversion window. The event manager 404 can also identify the event history for a particular user. The event manager 404 can perform these actions and operations as further described herein.

As shown, the event manager 404 includes a tokenizer 406 and a conversion path evaluator 408. The tokenizer 406 generates tokenized interactions (i.e., tokens) by grouping interactions having the same interaction type together. Interactions within a token become sub-tokenized interactions (i.e., sub-tokens). The tokenizer 406 creates and uses tokens and sub-tokens as described herein.

The conversion path evaluator 408, in general, generates and evaluates conversion paths for a user from the user's event history. For example, the conversion path evaluator 408 identifies positive and negative conversion paths for a user. As part of generating conversion paths, the conversion path evaluator 408 incorporates the lag of each interaction. The conversion path evaluator 408 also generates training observations based on each conversion path. The conversion path evaluator 408 performs these actions and operations as further described herein.

As shown, the media attribution system 104 also includes a training module 410. The training module 410 generally trains an algorithmic attribution model to obtain weights for each interaction and interaction type for one or more users. For example, the training module 410 employs machine learning algorithms and techniques (e.g., support vector machines, clustering, Bayesian networks, etc.) to train (and re-train) the algorithmic attribution model based on the training observations. The training module 410 can also train the algorithmic attribution model based on other input, such as control patterns or variables (e.g., user profile and/or demographic information) and other inputs. The training module 410 can perform these actions and operations as further described herein.

The scoring module 412, in general, determines an attribution score for each interaction and/or interaction type. For example, the scoring module 412 uses the algorithmic attribution model and the generated weights for each interaction to determine an attribution score for each interaction. Further, the scoring module 412 identifies additional interactions and interaction types to serve to a user that will best influence the user to purchase a particular product. The scoring module 412 can perform these actions and operations as further described herein.

As shown, the media attribution system 104 includes a visualization manager 414. In general, the visualization manager 414 provides visual results of the media attribution system 104 and algorithmic attribution model. In some embodiments, the visualization manager 414 provides a graphical user interface to a user, such as an administrator of a commercial entity, that enables the user to create interaction combinations and view the various types of combination results. The visualization manager 414 can perform these actions and operations as further described herein. Further, example visualization results are provided below.

Figure 5:
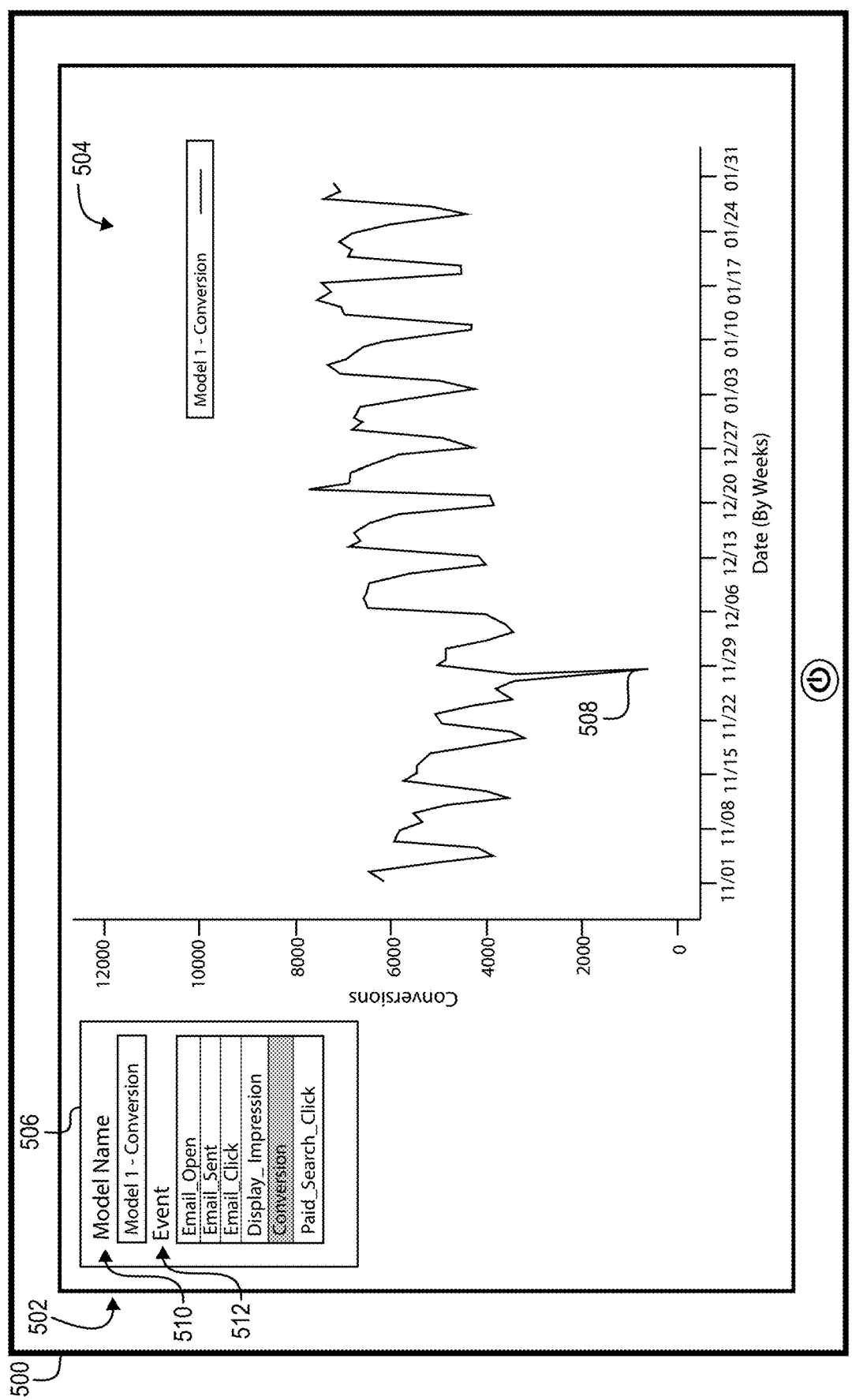
FIGS. 5-8 illustrate a client device displaying example visualizations generated by the media attribution system in accordance with one or more embodiments.
Figure 6:
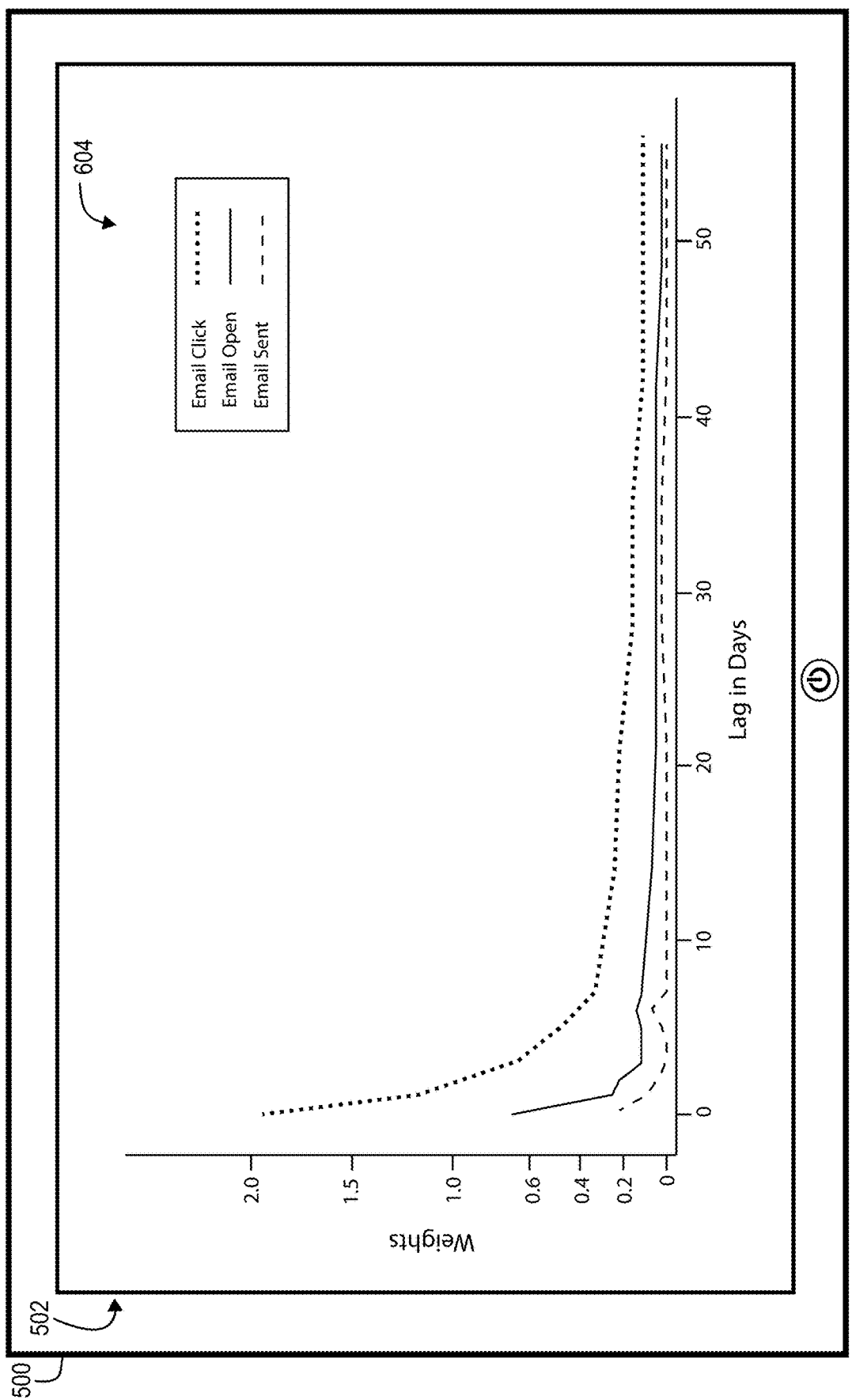
Figure 7:
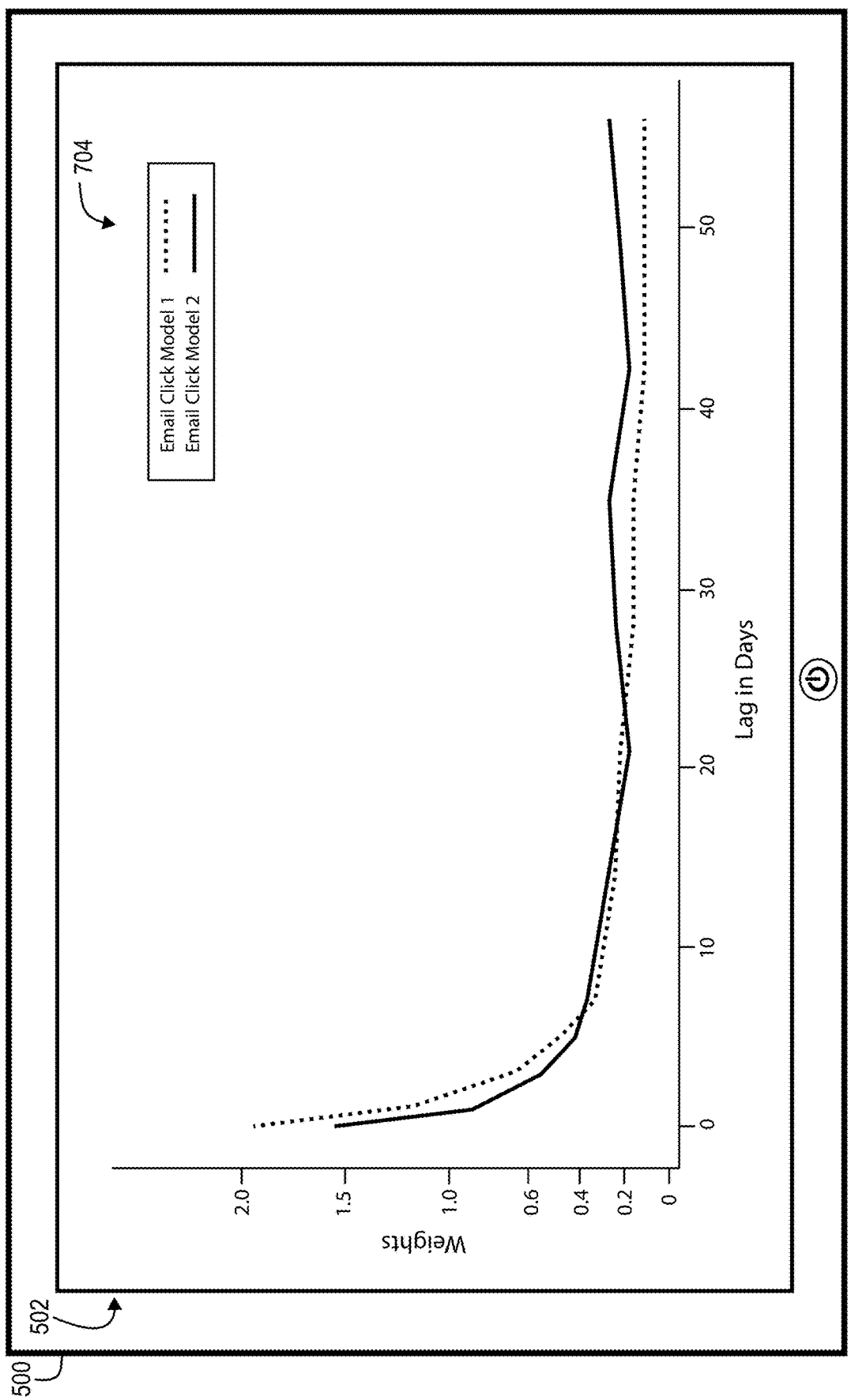
Figure 8:
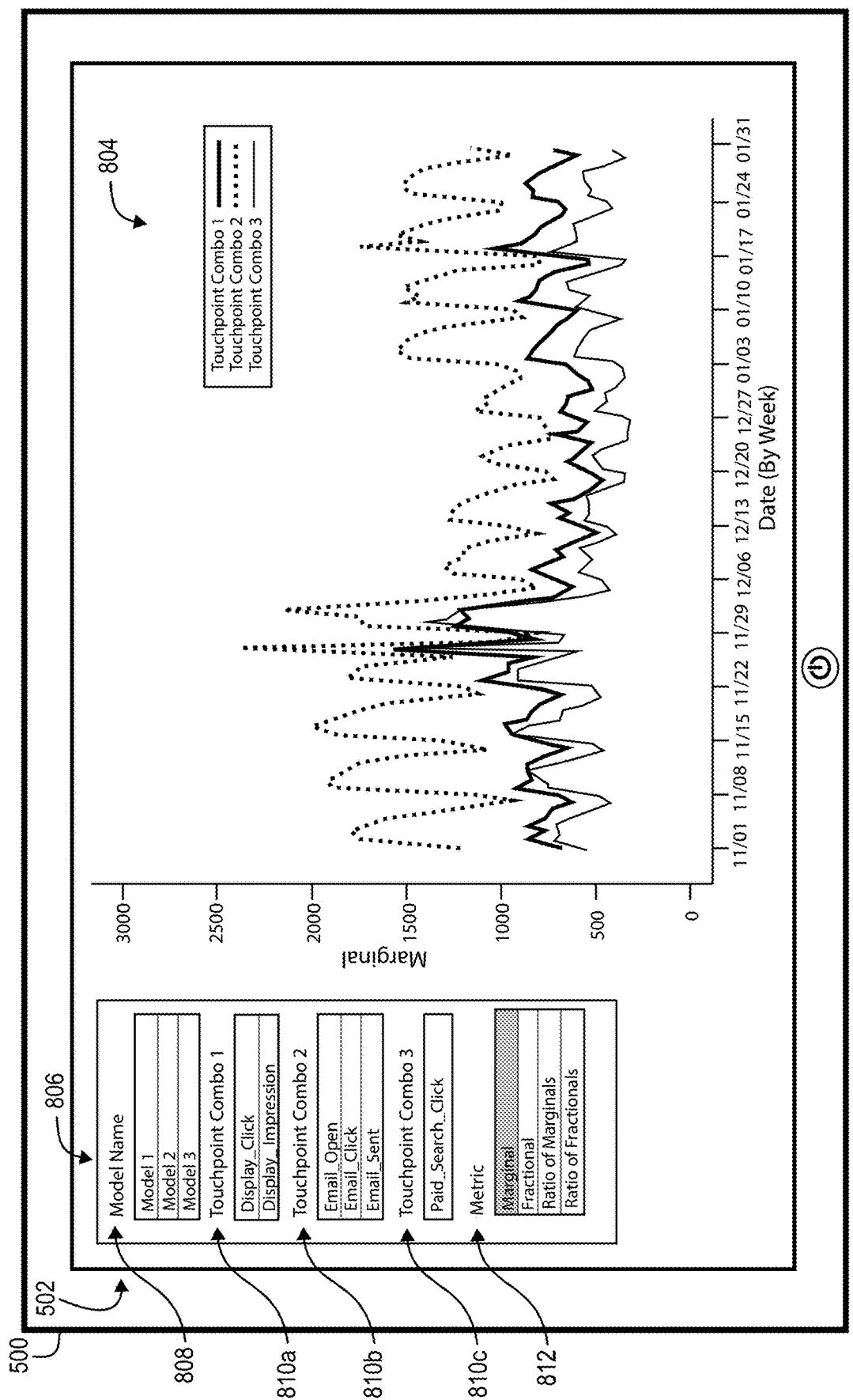

As mentioned, FIGS. 5-8, illustrate example visualization results of the media attribution system 104. To illustrate, FIG. 5 shows daily training visualization data for an algorithmic attribution model. FIG. 6 illustrates a comparison of decay curves for different interaction types. FIG. 7 illustrates a comparison of decay curves for a single interaction type between different algorithmic attribution models. FIG. 8 displays marginal score aggregates for different combinations of interaction types.

As a note, a client such as an administrator or manager of a commercial entity, interacts with the media attribution system 104 to create and view the various visualizations. This user is distinct from the users described above whose contact with the commercial entity forms interactions. As such, to avoid confusion, the administrative user in FIGS. 5-8 who interacts with the media attribution system 104 is referred to as an administrator.

As shown, FIG. 5 illustrates a client device 500 (e.g., the display of the client device 500) having a graphical user interface 502 that displays a visualization 504 and a control panel 506. In some embodiments, the graphical user interface 502 displays a media attribution dashboard that includes the visualization 504 and the control panel 506. For example, a media attribution application on the client device 500 provides the media attribution dashboard to an administrator.

The visualization 504 illustrates daily training visualization data for an algorithmic attribution model. As shown, the visualization 504 illustrates the number of conversions (y-axis) across various dates, shown in weekly increments (x-axis). Specifically, the number of conversions includes all conversions (e.g., purchases or downloads) for a particular product or group of products across all user purchases or downloads. The administrator can use visual results shown in the visualization 504 to identify changes over time, such as seasonal variations or other patterns.

In some embodiments, the visualization 504 assists the administrator in identifying missing data, anomalies, or errors. For example and as shown, the visualization 504 likely includes an error or anomaly (e.g., error 508). As such, the visualization 504 provides the administrator with triggers to inspect and monitor the data used to train the algorithmic attribution model. Further, in some embodiments, the media attribution system 104 provides additional tools for an administrator to quickly edit any errors or anomalies by interacting with the visualization 504.

The graphical user interface 502 also includes the control panel 506. In general, the control panel 506 facilitates interaction (e.g., by the administrator) to create various visual results. Accordingly, while the visualization 504 in FIG. 5 currently illustrates the result of conversions over time, the administrator can use the control panel 506 to change the result and/or add additional results to the visualization 504.

For example, the control panel 506 includes multiple control elements that enable an administrator to modify the result(s) of the visualization 504. In particular, the control panel 506 includes a model element 510 and an event element 512. The model element 510, in one or more embodiments, enables the administrator to input or select an algorithmic attribution model (or portion of an algorithmic attribution model), which the media attribution system 104 displays within the visualization 504. For instance, as shown, the administrator selects a training portion of an algorithmic attribution model. As shown and described below, the media attribution system 104 can enable the administrator to view and compare results across different models.

The event element 512 enables the administrator to select which event to display in the visualization 504. As mentioned above, events include interactions and conversions. Accordingly, the event element 512 enables the administrator to select a particular interaction type or to select conversions (shown as selected). As shown, the event element 512 is a drop-drop display element, however, one will appreciate that other display elements are possible.

As mentioned above, FIG. 6 illustrates a visualization 604 showing a comparison of decay curves for different interaction types. As shown, the visualization 604 includes decay curves for multiple interaction types. In particular, the visualization 604 includes a decay curve for clicked emails (e.g., a user selects a link within an email from the media attribution system 104), opened emails (e.g., a user opens an email from the media attribution system 104), and sent emails (e.g., the media attribution system 104 sends an email to a user). As shown, clicked emails are represented by a dotted line. Opened emails are represented by a solid line. Sent emails are represented by a dashed line.

Each decay curve shows the effect of lag on each interaction type. More specifically, each decay curve shows the weights for each interaction type generated by media attribution system 104 using an algorithmic attribution model over time as a result of lag (measured in days). Accordingly, each decay curve shows a decay in weight as lag increases.

The visualization 604 enables an administrator to compare the effect of interactions relative to each other. Thus, as shown, a user that opens an email is more likely to purchase a corresponding product than a user that merely receives or opens the email with no further action. Further, the visualization 604 shows a comparison of the rates of decay over time between interaction types due to lag. For example, if a user does not open an email within the first few days, the likelihood of conversion sharply drops. In contrast, the rate of decay for sent emails is less steep in the first few days, but quickly drops to a weight near 0 after that.

FIG. 7 illustrates visualization 704 showing a comparison of decay curves for a single interaction type between different algorithmic attribution models. While the decay curves in FIG. 6 correspond to different interaction types for the same algorithmic attribution model, the visualization 704 in FIG. 7 includes decay curves for the same interaction type resulting from different algorithmic attribution models. As an overview, the media attribution system 104 can create a separate algorithmic attribution model for each product or group of products. For example, the media attribution system 104 generates a separate algorithmic attribution model for Product A and Product B. As such, the visualization 704 compares the decay curves between two algorithmic attribution models.

While FIG. 6 and FIG. 7 illustrate display curves, one will appreciate that other visual results are possible. For example, based on user input from an administrator, the media attribution system 104 provides a visualization that includes a result for a given interaction type from a given model as well as a result for a different interaction type from a different model. Accordingly, the media attribution system 104 can provide various combinations of results and models within a visualization.

As mentioned above, FIG. 8 displays marginal score aggregates for different interaction combinations (e.g., combination of interaction types). As shown, the graphical user interface includes a visualization 804 and a control panel 806. As with previous figures, the control panel 806 enables an administrator to provide user input, which the media attribution system 104 processes and displays within the visualization 804. In some embodiments, the graphical user interface 502 displays a media attribution dashboard that includes the visualization 804 and the control panel 806. For example, a media attribution application on the client device 500 provides the media attribution dashboard to an administrator As shown in FIG. 8, the control panel 806 includes multiple control elements that enable the administrator to modify the result(s) of the visualization 804. In particular, the control panel 506 includes a model element 808, interaction input elements 810a-810c, and a metric element 812. As described above, the model element 808, in one or more embodiments, enables the administrator to input or select one or more algorithmic attribution models (or portions thereof), which the media attribution system 104 displays within the visualization 804.

Each of the interaction input elements 810a-810c enable the administrator to indicate one or more interactions to show within the visualization 804. Of note, each of the interaction input elements 810a-810c enables the administrator to input a combination of interaction types. For example, the first interaction input elements 810a includes a combination of display interaction types (e.g., display clicks and display impressions). The second interaction input elements 810b includes a combination of email interaction types (e.g., opened emails, clicked emails, and sent emails). The third interaction input element 810c includes a single interaction type (e.g., paid search clicks).

The metric element 812 is shown as a drop-down element that enables an administrator to change the metric being compared in the visualization 804. The administrator selects the "marginal" (e.g., marginal scores) metric. Alternatively, the administrator may select a metric corresponding to fractional scores, marginal score ratios, fractional score ratios, or other options not shown. In some embodiments, the administrator can select multiple metrics for the media attribution system 104 to display within the visualization 804.

The visualization 804 shows the results of the inputs within the control panel 806. As shown, the visualization 804 displays the marginal scores (y-axis) of the three interaction combinations over time (x-axis). As with other visualizations described above, the results are generated based on data from all (or a subset of) users that contributed to the selected model (e.g., see model element 808). Based on the visualization 804, an administrator can identify patterns and irregularities between and among the various interaction combinations. For example, based on the marginal scores in the visualization 804, an administrator can determine that a first interaction combination is twice as influential as a second interaction combination. Stated differently, the probability of conversion from the first interaction combination higher than the probability of conversion from the second interaction combination.

As mentioned above, additional detail and examples of computing tokens, marginal scores, and fractional scores are provided. The following provides a detailed embodiment of determining tokens, marginal scores, and fractional scores. As a brief overview, tokenization includes grouping neighboring touchpoints (i.e., interactions) having the same touchpoint type (i.e., sub-tokens) together into tokenized touchpoints (i.e., tokens) if they occur within a particular defined time interval.

In the example embodiment, the media attribution system 104 uses the following parameters to determine tokens: newTouchPoint, tokenHead.time, and tokenTail.time. The parameter newTouchPoint represents a new touchpoint having the same touchpoint type as other touchpoints. The parameter tokenHead represents the time of the first touchpoint in the current token and the parameter tokenTail.time represents the time of the last touchpoint in the current token.

The media attribution system 104 creates tokens based on the following conditions: condition1: newTouchPoint is detected, condition2: newTouchPoint.time−tokenHead.time<time_to_token_head_upper, and condition3: newTouchPoint.time−tokenTail.time<time_to_token_tail_upper. If condition1 && (condition2||condition3) are true, then the media attribution system 104 adds newTouchPoint into the current token as a sub-token.

In addition, as mentioned above, the media attribution system 104 often determines a marginal score and a fractional score as part of determining attributions scores. As a brief overview, a marginal score indicates the incremental value of increasing probability gained by adding a given touchpoint in view of other touchpoints in a conversion path. A fractional score is the result of normalizing the marginal scores for a conversion part. In some embodiments, normalizing is necessary because of the presence of a baseline effect (i.e., intercept) or another constant that causes the total marginal score (e.g., the sum of probabilities) to not add up to 1 or 100%. As such, the media attribution system 104 determines fractional scores to normalize the total marginal score of a conversion path to equal 1 or 100%.

In the example embodiment, as part of determining the marginal score for a touchpoint in a conversion path, the media attribution system 104 first identifies the generated weight and lag for the touchpoint. As mentioned above, the media attribution system 104 can calculate the lag for a touchpoint based on the age of the touchpoint relative to the end time of the conversion path (e.g., end timestamp or conversion timestamp). In additional embodiments, the media attribution system 104 also uses bins to determine the lag of a touchpoint. For example, consider a lag bin defined as follows: lagBin[0, 1, 2, 3, 4, 5, 6, 7, 14, 21, 28, 35, 42, 49, 56, 9999]. If a touchpoint has a lag of 25, the media attribution system 104 either groups the lag with bin 21 (e.g., bins downwards) or bin 28 (e.g., bins upwards). In some instances, the media attribution system 104 bins upwards, and thus, the media attribution system 104 would include a touchpoint with a lag of 25 with the 28 bin. Further, if a lagBin has lesser traffic (i.e., less than 0.1 percentage of total traffic through all the lagBins) for all the users combined, then the media attribution system 104 groups the lagBin with other lagBin either downwards or upwards.

Along with lag, in various embodiments, the media attribution system 104 also calculates the age of a touchpoint. The age of a touchpoint can correspond to a starting touchpoint in a conversion path. For example, if a touchpoint in a conversion path occurs three days (or another discrete time unit) after the first touchpoint in the conversion path, the age of the given touchpoint is 3. In some embodiments, the media attribution system 104 uses the age of a touchpoint to discretize the touchpoint, as described above.

Further, the media attribution system 104 can apply binning with age in a similar manner as it does with lag. For example, the media attribution system 104 employs age binning (e.g., ageBin[−1, 0, 1, 2, 3, 4, 5, 6, 7, 14, 21, 28, 35, 42, 49, 56, 63, 77, 91, 105, 133, 161, 189, 9999]) and bin either upwards or downwards. In the case a touchpoint has no specified age, the media attribution system 104 assigns the touchpoint an age of −1 to indicate no age. Using the age, in some embodiments, the media attribution system 104 discretized events (e.g., into days), as described above.

Once the media attribution system 104 determines the lag of a touchpoint, the media attribution system 104 can identify the weight of the touchpoint from weights generated by the trained algorithmic attribution model. For example, in the example embodiment, the media attribution system 104 first identifies other touchpoints having the same touchpoint type from the algorithmic attribution model. Next, the media attribution system 104 then finds the touchpoint having the same touchpoint type having the same (or closest) lag to the touchpoint. The media attribution system 104 then applies the weight of the identified touchpoint having the same lag to the touchpoint. In this manner, the weight for the touchpoint is a factor of the touchpoint's type and lag.

The media attribution system 104 can use the identified weights to compute a marginal score for each touchpoint in the conversion path. In the example embodiment, the media attribution system 104 first orders the touchpoint in the conversion path by time. To illustrate, a touchpoint path includes the following weights (i.e., coefficient) ordered by time: $e_0, e_1, e_2, e_3, \ldots, e_n$, where $e_0$ is the baseline effect, or the intercept described above. Accordingly, the cumulative effect ordered by time is: E0, E1, E2, E3, ..., En, where conversion path E0=e0, conversion path E1=e0+e1, conversion path E2=e0+e1+e2, etc.

Next, to find a marginal score for each touchpoint for touchpoint i, the media attribution system 104 applies Equation 3, as follows:

$$\frac{\frac{e^{Ei}}{1+e^{Ei}} - \frac{e^{E(i-1)}}{1+e^{E(i-1)}}}{\frac{e^{En}}{1+e^{En}}} \quad (3)$$

Equation 3 is a more detailed version of Equation 1 provided above. As such, Equation 3 represents the probability of a user's conversion given all touchpoints in the conversion path (including the baseline probability) from the first touchpoint to touchpoint i (e.g., the portion using Ei) minus the probability of a user's conversion given all touchpoints in the conversion path (including the baseline probability) from the first touchpoint to the touchpoint just prior to touchpoint i (e.g., the portion using Ei-1), divided by the probability of a user's conversion given all touchpoints (including the baseline probability) in the conversion path (e.g., the portion using En).

Further, the media attribution system 104 applies Equation 4 to determine the total marginal score for the conversion path, as follows:

$$\frac{\frac{e^{En}}{1+e^{En}} - \frac{e^{E0}}{1+e^{E0}}}{\frac{e^{En}}{1+e^{En}}} \quad (4)$$

Equation 4 is a more detailed version of Equation 2 provided above. As such, the total marginal score for the conversion path is the probability of conversion for all touchpoints in a path including the baseline effect minus the baseline effect only, which results in the probability of conversion given all the touchpoints in the conversion path beyond the baseline probability effect.

As mentioned above, some touchpoints in a conversion path are tokens (e.g., tokenized touchpoints) that include sub-tokens (e.g., sub-tokenized touchpoints). In the example embodiment, the media attribution system 104 uses the timestamp of last occurring sub-token in a token to determine lag, identify weight, and compute a marginal score for the token. However, as part of determining attribute scores, the media attribution system 104 redistributes the marginal score across all sub-tokens in a token.

To illustrate, consider the following example. A user is shown 11 display ads before purchasing the targeted product. Each display ad is denoted D1-D11. The media attribution system 104 tokenizes the display ads as follows (assume a compression ratio of 20%): Token1: D1; Token2: D2-D6; and Token3: D7-D11

As a note, in this example, the media attribution system 104 tokenizes starting at the last touchpoint (e.g., D11). Thus, the media attribution system 104 created the following tokens: D11-D7, D6-D2, and D1. Then, the media attribution system 104 arranges the tokens according to their representative timestamp (e.g., Token1 based on the timestamp of D1, Token2 based on the timestamp of D6, and Token3 based on the timestamp of D11).

Using the above tokens, the media attribution system 104 identifies the weight for Token1 based on the lag of D1, the weight for Token2 based on the lag of D6, and the weight for Token3 based on the lag of D11. Likewise, the media attribution system 104 uses D1, D6, and D11 to determine the marginal score for Token1, Token2, and Token 3, respectively, as well as the total marginal score for the conversion path. Further, assume that the following marginal scores: Marginal Score for Token1: 0.1; Marginal Score for Token2: 0.3; Marginal Score for Token3: 0.5; and Total Marginal Score for Conversion Path: 0.9.

As an example, to calculate the marginal score for Token2, the media attribution system 104 computes (assume D0 is the baseline effect): ([probability of conversion given D0+D1+D6]−[probability of conversion given D0+D1])/(probability of conversion given D0+D1+D6+D11]), which results in the marginal score of 0.3.

As shown, Token3 has a larger marginal score than Token2 even though each token has five sub-tokens. This result occurs because the media attribution system 104 incorporates the lag of each token when identifying weights, which are then used to determine the marginal scores. Stated differently, the marginal scores differ between Token2 and Token3 because the Token2 has a larger lag than Token3, and thus, a lower score. In some embodiments and for particular touchpoint types, a larger lag may result in higher weights and higher marginal scores.

In addition, the total marginal score for the conversion path is the same as adding up the individual tokens (e.g., 0.5+0.3+0.1=0.9). As shown, the total marginal score does not equal 1.0 (or 100%). As noted above, the baseline effect or other constants can case the total marginal score to equal less than 1.0.

Next, as part of determining the attribution scores and as mentioned above, for each token in a conversion path, the media attribution system 104 distributes (equally or non-equally) the marginal score for each token among all sub-tokens in a token. For example, the media attribution system 104 divides the marginal score evenly among all the sub-tokens in a token. To illustrate, for Token2, the media attribution system 104 divides the marginal score (e.g., 0.3) by 5 (e.g., five sub-tokens in the token) to obtain the marginal score of 0.06 for each sub-token. Likewise, for Token3, the system divides the marginal score (e.g., 0.5) by 5 (e.g., five sub-tokens in the token) to obtain the marginal score of 0.1 for each sub-token. Accordingly, the media attribution system 104 computes the followings marginal score for D1-D11: Marginal Score for D1: 0.1; Marginal Score for each of D2-D6: 0.3; and Marginal Score for each of D7-D11: 0.1.

In this manner, the media attribution system 104 scores each touchpoint in the conversion path with an individual marginal score. Alternatively, the media attribution system 104 distributes the marginal score for each token among the sub-tokens in a token unevenly (e.g., the media attribution system 104 scores the latter occurring sub-tokens greater than earlier sub-token (e.g., linearly proportional) based on the timestamp of the sub-tokens).

Further, as mentioned above, the media attribution system 104 can normalize the media attribution system 104 to obtain fractional scores. To obtain a fractional score for touchpoint i, the media attribution system 104 applies Equation 5, as follows:

$$\text{marginal\_for\_touch\_point\_i/total\_marginal} \quad (5)$$

To illustrate, the total marginal score in the example above is 0.9. As such, the fractional score for Token1 is 0.1/0.9 or 0.1112. The fractional score for Token2 is 0.3/0.9 or 0.3334. The fractional score for Token3 is 0.5/0.9 or 0.5556. Further, the total fractional score is 1.0. Likewise, the media attribution system 104 can determine the fractional score for each sub-token within a token using the same principles.

Similar to how the lag of a touchpoint within a conversion path affects the affinity score of the touchpoint type, the value of a conversion can also affect scores. In one or more embodiments, the media attribution system 104 trains the algorithmic attribution model to generate weights based on the value of a transaction associated with a conversion. For example, the media attribution system 104 adds a parameter related to the transaction value of a conversion, which carries over into positive conversion paths and training observations. As such, in some embodiments, the media attribution system 104 gives greater importance (e.g., greater weight) to touchpoints that result in larger purchases in the algorithmic attribution model.

In some embodiments, the media attribution system 104 applies a smoothing parameter or other coefficient constraints to enforce a monotonically decreasing decay curve as lag increases. For example, when applying a smoothing parameter, the media attribution system 104 smoothens all touchpoints. If the media attribution system 104 does not apply the smoothing parameter, then the media attribution system 104 smoothens only sparse touchpoints, and denser touchpoints may have kinks that do not follow a monotonically decreasing decay curve as lag increases. As a note, sparse touchpoints can include touchpoints whose total data percentage is between 0.1-5.0%.

In various embodiments, the media attribution system 104 employs down-sampling to achieve improved results. In general, the media attribution system 104 will identify a greater number of negative conversion paths (e.g., days with no conversion) than positive conversion paths. Down-sampling involves proportionally reducing the number of negative conversion paths to have the same (or closer) magnitude as the number of positive conversion paths. Down-sampling, therefore, reduces the amount of computational resources needed to train and employ the algorithmic attribution model, thus improving one or more computing devices implementing the media attribution system 104 and/or algorithmic attribution models.

FIGS. 1A-8, the corresponding text, and the examples provide a number of different systems and devices of the media attribution system 104 in accordance with one or more embodiments. In addition to the foregoing, one or more embodiments can also be described in terms of flowcharts comprising acts in a method for accomplishing a particular result. For example, FIG. 9 illustrates a flowchart of an exemplary method in accordance with one or more embodiments.

Figure 9:
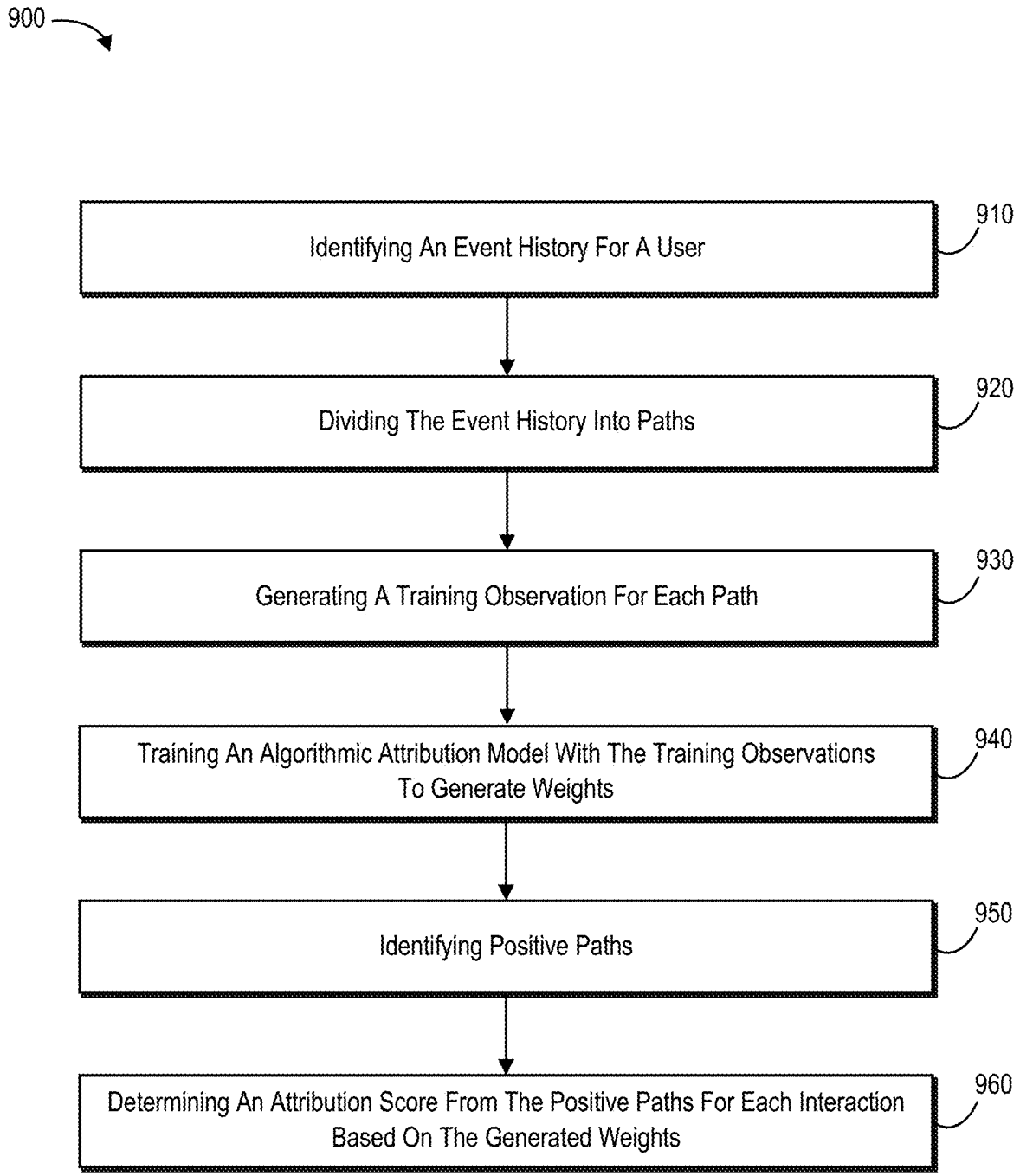
FIG. 9 illustrates an example flow diagram of a method for generating multi-channel media attributions in accordance with one or more embodiments.

FIG. 9 illustrates an example flow diagram of a method for generating media touchpoint attributions. In one or more embodiments, the method 900 is implemented on a computing device, such as a client device or a service device. Further, in some embodiments, the method 900 is implemented in a digital environment for employing algorithmic attribution models, as described herein.

The method 900 includes an act 910 of identifying an event history for a user. In particular, act 910 can involve identifying an event history for a user comprising a set of touchpoints and a set of conversions corresponding to the user. In some embodiments, the act 910 involves receiving a collection of event data that includes a plurality of touchpoints, where each touchpoint in the plurality of touchpoints represents an interaction, by a plurality of users, with a product or service. In additional embodiments, the act 910 also includes identifying the event history for the user based on identifying touchpoints from the plurality of touchpoints that correspond to a user identifier or user id of the user.

As shown in FIG. 9, the method 900 further includes an act 920 of dividing the event history into a plurality of paths. In particular, the act 920 involves dividing the event history into a plurality of paths, where each path includes a conversion indication and at least one touchpoint from the set of touchpoints. In various embodiments, the act 920 can include describing the touchpoints for the user based on a time unit, such as calendar days. Further, in some embodiments, the act 920 involves generating the plurality of paths based on the touchpoints occurring within each time unit as well as previous time units.

The method 900 also includes an act 930 of generating a training observation for each path. In particular, the act 930 can involve generating, for each path of the plurality of paths, a training observation for an algorithmic attribution model. The training observation including an insight defining one or more attributes of an associated path In one or more embodiments, the training observation includes a response variable indicating a positive conversion or a negative conversion and one or more dependent variables indicating a frequency occurrence of each touchpoint included in the path.

As shown in FIG. 9, the method 900 further includes an act 940 of training an algorithmic attribution model with the training observations to generate weights. In particular, the act 940 involves training, using the training observation, the algorithmic attribution model to generate weights for each touchpoint type from the event history. In one or more embodiments, the act 940 includes employing machine learning to train the algorithmic attribution model using the training observation. For example, in one or more embodiments, training the algorithmic attribution model comprises inputting the training observation into a support vector machine to build the algorithmic attribution model.

Additionally, the method 900 includes an act 950 of identifying positive paths. In particular, the act 950 can involve identifying one or more paths from the plurality of paths that includes a positive conversion indication. In one or more embodiments, the act 950 of identifying positive paths includes identifying paths from the plurality of paths that include a conversion indication.

The method 900 also includes an act 960 of determining an attribution score from the positive paths for each interaction based on the generated weights. In particular, the act 960 can involve determining an attribution score for each touchpoint in an identified path based on the generated weights corresponding to each touchpoint type in the identified path. In various embodiments, the act 960 includes computing a marginal score for each touchpoint in the identified path. In some embodiments, the act 960 includes computing a fractional score for each touchpoint in the identified path based on the computed marginal score for each touchpoint in the one or more positive paths.

The method 900 can also include additional acts. In one or more embodiments, the method 900 includes the act of generating a tokenized touchpoint that includes two or more touchpoints based on the two or more touchpoints having the same touchpoint type and occurring within a time threshold of each other. In additional embodiments, the method 900 includes the act of determining a marginal score for the tokenized touchpoint. In some embodiments, the method 900 includes the act of distributing the marginal score for the tokenized touchpoint among the two or more touchpoints having the same touchpoint type and occurring within a time threshold of each other. In some embodiments, the method 900 includes the act of determining a fractional score for the tokenized touchpoint by normalizing the marginal score for the tokenized touchpoint.

In one or more embodiments, the method 900 includes the act of filtering the touchpoint history based on a conversion window that includes a set time frame. In some embodiments, the method 900 includes the act of receiving a collection of event data that includes the plurality of touchpoints, wherein each touchpoint in the plurality of touchpoints represents an interaction, by a plurality of users, with a product or service.

In various embodiments, the method 900 includes the act of determining, for each touchpoint in each path of the plurality of paths, a touchpoint lag parameter, where the touchpoint lag parameter indicates the elapsed time between the touchpoint and an end time of the path to which the touchpoint belongs. In some cases, when the path is positive, the end time of the path to which the touchpoint belongs is a conversion timestamp. In additional embodiments, the method 900 includes the act of applying a smoothing parameter that enforces a monotonically decreasing decay for each touchpoint as the touchpoint lag parameter for the touchpoint increases.

In some embodiments, the method 900 also includes the act of outputting a visualization displaying the generated weights for each touchpoint form the event history for a plurality of users. In alternative embodiments, the method 900 includes the act of outputting a visualization displaying marginal scores and fractional scores of each touchpoint from the event history for a plurality of users.

The term "digital environment," as used herein, refers generally to an environment implemented, for example, as a stand-alone application (e.g., a personal computer or mobile application running on a computing device), as a module of an application, as a plug-in for an application, as a library function or functions that may be called by a network application creation system, as a server device, and/or as a cloud-computing system. A digital medium environment allows the media attribution system 104 to employ algorithmic attribution models to provide attribution scores to touchpoints and touchpoint types.

Embodiments of the present disclosure may include or utilize a special-purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can include at least two distinctly different kinds of computer-readable media: non-transitory computer-readable storage media (devices) and transmission media.

Non-transitory computer-readable storage media (devices) includes RAM, ROM, EEPROM, CD-ROM, solid state drives, Flash memory, phase-change memory, other types of memory, other optical disk storage, magnetic disk storage or other magnetic storage devices, or any other medium used to store desired program code means in the form of computer-executable instructions or data structures, and accessible by a general-purpose or special-purpose computer.

Computer-executable instructions include, for example, instructions and data which, when executed by a processor, cause a general-purpose computer, special-purpose computer, or special-purpose processing device to perform a certain function or group of functions. In some embodiments, computer-executable instructions are executed by a general-purpose computer to turn the general-purpose computer into a special-purpose computer implementing elements of the disclosure. The computer executable instructions may be, for example, binaries, intermediate format instructions such as assembly language, or even source code. Although the subject matter has been described in language specific to structural features and/or methods, it is to be understood that the subject matter defined in the appended claims is not necessarily limited to the described features or acts described above. Rather, the described features and acts are disclosed as example forms of implementing the claims.

Figure 10:
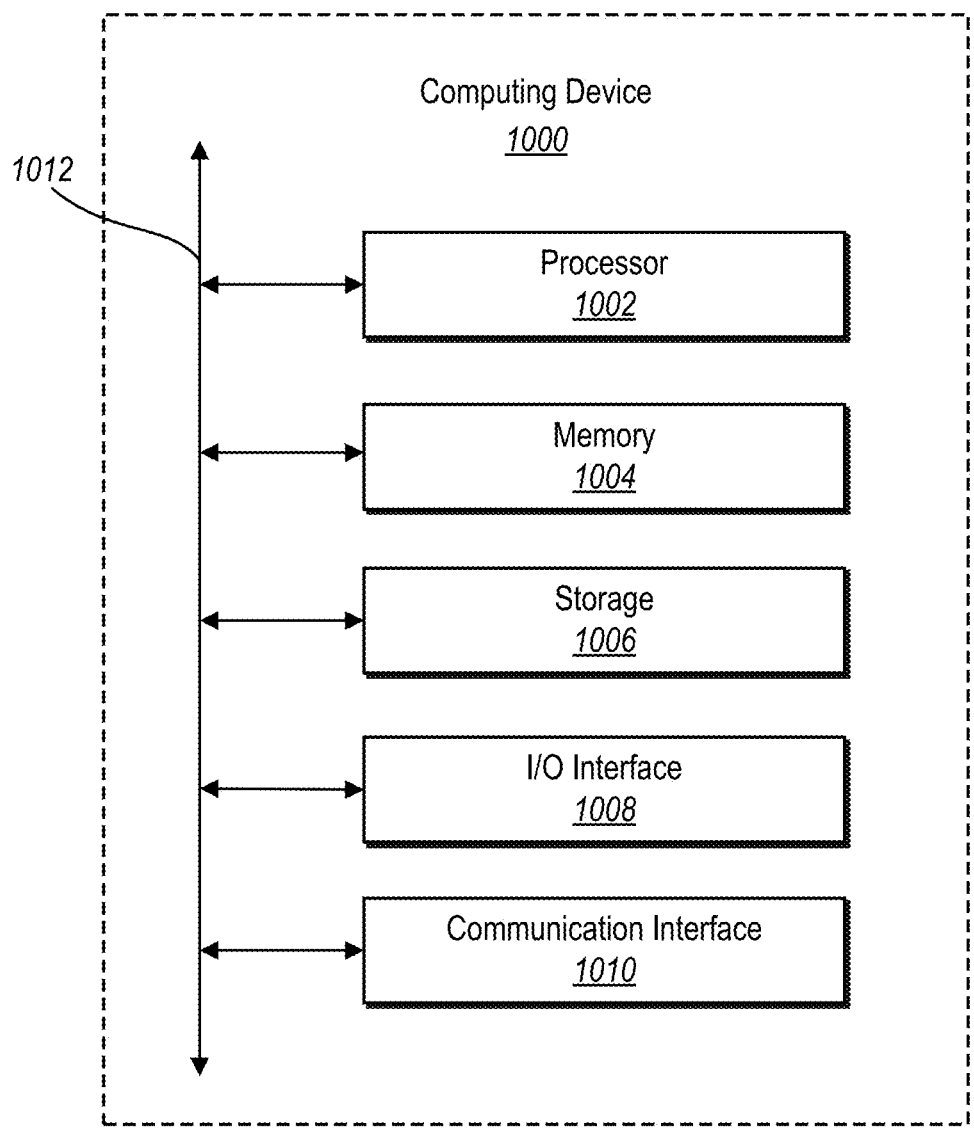
FIG. 10 illustrates a block diagram of an exemplary computing device in accordance with one or more embodiments.

FIG. 10 illustrates a block diagram of an exemplary computing device 1000 that may be configured to perform one or more of the processes described above. One will appreciate that one or more computing devices, such as the computing device 1000 may represent the client devices 400, 500 described above. In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device).

As shown in FIG. 10, the computing device 1000 can include one or more processor(s) 1002, memory 1004, a storage device 1006, input/output ("I/O") interfaces 1008, and a communication interface 1010, which may be communicatively coupled by way of a communication infrastructure (e.g., bus 1012). While an exemplary computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read-Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that couples components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital environment for utilizing algorithmic attribution machine-learning models, a computer-implemented method for generating multi-channel media attributions, the method comprising:
   identifying, for a user identifier, a user event history that includes a set of touchpoints and a set of positive conversion indications;
   determining a plurality of discretized time units in which the set of touchpoints and the set of positive conversion indications occur;
   generating, for the plurality of discretized time units, a plurality of paths comprising one or more positive conversion paths and one or more negative conversion paths, wherein a positive conversion path comprises one or more touchpoints occurring within a single discretized time unit and a positive conversion indication, wherein a negative conversion path comprises one or more touchpoints occurring within a discretized time unit without a positive conversion indication;
   determining, for at least one touchpoint in each path, a touchpoint lag parameter by determining a number of the discretized time units that occur between a discretized time unit in which the at least one touchpoint in the path occurs and a positive conversion indication in the path;
   generating, for each path of the plurality of paths, a model observation for an algorithmic attribution machine-learning model, wherein the model observation for a given path of the plurality of paths comprises the at least one touchpoint in the given path, the touchpoint lag parameter for the at least one touchpoint in the given path, and the conversion indication in the given path;
   generating, using the model observations, the algorithmic attribution machine-learning model to determine weights for each touchpoint type from the user event history at each of the touchpoint lag parameters;
   identifying a target path comprising a plurality of touchpoints and a positive conversion indication;
   determining, based on the touchpoint type and the touchpoint lag parameter of each given touchpoint of the plurality of touchpoints in the target path, an attribution score for the given touchpoint in the target path based on the generated weights of the algorithmic attribution machine-learning model; and
   providing, for display on a client device, the attribution scores for the plurality of touchpoints in the target path.

2. The method of claim 1, further comprising:
   identifying a path of the plurality of paths comprising at least two touchpoints of a same touchpoint type occurring within a same discretized time unit of the plurality of discretized time units;
   generating a tokenized touchpoint comprising the at least two touchpoints of the same touchpoint type occurring within the same discretized time unit; and
   replacing the at least two touchpoints in the path with the tokenized touchpoint before generating the algorithmic attribution machine-learning model.

3. The method of claim 2, further comprising determining a marginal score for the tokenized touchpoint based on determining a first probability of a positive conversion occurring given the path ending in the tokenized touchpoint, a second probability of a positive conversion occurring given the path ending at a touchpoint prior to the tokenized touchpoint, and a third probability of a positive conversion occurring given all touchpoints in the path.

4. The method of claim 3, further comprising distributing the marginal score for the tokenized touchpoint among the at least two touchpoints of the tokenized touchpoint.

5. The method of claim 3, further comprising determining a fractional score for the tokenized touchpoint by normalizing the marginal score for the tokenized touchpoint.

6. The method of claim 3, further comprising providing, for display on the client device within a graphical user interface, the marginal score for each of the touchpoints in the target path.

7. The method of claim 1, further comprising receiving a collection of event data that includes the set of touchpoints, wherein each touchpoint in the set of touchpoints represents an interaction with a product or service by a plurality of user identifiers.

8. The method of claim 7, further comprising identifying the user event history based on identifying touchpoints from the set of touchpoints that correspond to a user identifier.

9. The method of claim 1, wherein generating a model observation for the given path comprises:
   generating a response variable for the conversion indication indicating a positive conversion or a negative conversion for the given path; and
   generating at least one dependent variable for the at least one touchpoint in the given path indicating a frequency of occurrence of at least one touchpoint type included in the given path.

10. The method of claim 9, wherein the touchpoint lag parameter comprises a discretized time unit in hours, days, weeks, or months.

11. The method of claim 9, wherein the touchpoint lag parameter comprises a dynamic discretized time unit based on event times.

12. The method of claim 11, wherein generating the algorithmic attribution machine-learning model comprises inputting the model observation into a support vector machine to build the algorithmic attribution machine-learning model to determine weights for each touchpoint type from the user event history at each of the touchpoint lag parameters.

13. The method of claim 11, further comprising applying a smoothing parameter while generating the algorithmic attribution machine-learning model that enforces a monotonically decreasing decay for each touchpoint in the given path as the touchpoint lag parameter for the touchpoint increases in value.

14. The method of claim 1, wherein, providing, for display on the client device, the attribution score for the touchpoints in the identified target path, comprises providing a visualization displaying:
   the weights generated for a plurality of touchpoint types for a plurality of user identifiers; or
   marginal scores and fractional scores of the plurality of touchpoint types for the plurality of user identifiers.

15. A system for generating multi-channel media attributions, the system comprising:
   at least one processor,
   a memory comprising touchpoints corresponding to interactions by a plurality of user identifiers; and
   at least one non-transitory computer-readable storage medium storing instructions that, when executed by the at least one processor, cause the system to:
   filter a plurality of events based on a user identifier and a time period to identify a user event history, the user event history comprising a set of touchpoints and a set of conversions corresponding to the user identifier within the time period;
   determine a plurality of discretized time units in which the set of touchpoints and the set of conversions occur;
   discretize the plurality of discretized time units into a plurality of paths comprising one or more positive conversion paths and one or more negative conversion paths, wherein a positive conversion path comprises one or more touchpoints occurring within a single discretized time unit and a positive conversion indication, wherein a negative conversion path comprises one or more touchpoints occurring within a discretized time unit without a positive conversion indication;
   determine, for at least one touchpoint in each path, a touchpoint lag parameter by determining a number of the discretized time units that occur between a discretized time unit in which the at least one touchpoint in the path occurs and a positive conversion indication in the path;
   append, to the one or more touchpoints in each path, the touchpoint lag parameter determined for the one or more touchpoints in each path;
   generate, for the plurality of paths, model observations for an algorithmic attribution machine-learning model by identifying paths that comprise a positive conversion indication and paths that comprise a negative conversion indication;
   generate, using the model observations, the algorithmic attribution machine-learning model to generate weights for each touchpoint type from the user event history at each of the touchpoint lag parameters by generating a prediction using current values of the weights and calculating new values for the weights based on error in the prediction;
   identify a target path that includes a plurality of touchpoints and a positive conversion indication;
   determine, based on the touchpoint type of the plurality of touchpoints and touchpoint lag parameter of the plurality of touchpoints in the target path, an attribution score for each touchpoint of the plurality of in the target path based on the generated weights of the algorithmic attribution machine-learning model; and
   provide, for display on a client device, the attribution scores for the plurality of touchpoints in the target path.

16. The system as recited in claim 15, wherein the instructions that, when executed by the at least one processor, cause the system to determine an attribution score for each touchpoint in the target path by generating a marginal score for each touchpoint in the target path, wherein the marginal score for a given touchpoint in the target path comprises a probability that the given touchpoint influenced the conversion based on sequence order and timing of the given touchpoint relative to other touchpoints in the target path.

17. The system as recited in claim 16, further comprising instructions that, when executed by the at least one processor, cause the system to generate a fractional score for each touchpoint in the target path based on normalizing the marginal score to a uniform scoring measurement.

18. In a digital environment for utilizing algorithmic attribution machine-learning models, a computer-implemented method for generating multi-channel media attributions, the method comprising:

identifying a user event history that includes a set of touchpoints and a set of conversions corresponding to a user identifier;

determining a plurality of discretized time units in which the set of touchpoints and a set of positive conversion indications occur;

dividing the plurality of discretized time units into a plurality of paths comprising one or more positive conversion paths and one or more negative conversion paths, wherein a positive conversion path comprises one or more touchpoints occurring within a single discretized time unit and a positive conversion indication, wherein a negative conversion path comprises one or more touchpoints occurring within a discretized time unit without a positive conversion indication;

determining, for at least one touchpoint in each path, a touchpoint lag parameter by determining a number of the discretized time units that occur between a discretized time unit in which the at least one touchpoint in the path occurs and a positive conversion indication in the path;

a step for generating weights for each touchpoint type from the user event history at each of the touchpoint lag parameters;

a step for determining an attribution score for each touchpoint in a target path that comprises a plurality of touchpoints and a positive conversion indication based on at least one touchpoint from the target path, at least one touchpoint lag parameter for the at least one touchpoint, and the generated weights; and providing, for display on a client device, the attribution scores for the plurality of touchpoints in the target path.

19. The method of claim 18, further comprising tokenizing multiple touchpoints of a same type occurring within a same discretized time unit of a path of the plurality of paths into a single tokenized touchpoint within the path.

20. The method of claim 18, wherein the touchpoint lag parameter is measured as a unit of time measured in hours, days, weeks or months.

\* \* \* \* \*